United States Patent [19]

Morimoto et al.

[11] Patent Number: 5,189,106

[45] Date of Patent: Feb. 23, 1993

[54] POLYETHYLENE COMPOSITION

[75] Inventors: Toshifumi Morimoto, Yokohama; Takaaki Hattori, Yawata; Noboru Ikegami, Chigasaki; Hirofumi Nishibu, Yokohama; Toshiyuki Miyauchi, Kawasaki; Kunimichi Kubo, Meguro, all of Japan

[73] Assignee: Nippon Petrochemicals Company, Limited, Tokyo, Japan

[21] Appl. No.: 814,774

[22] Filed: Dec. 30, 1991

[51] Int. Cl.$^5$ ............... C08L 23/06; C08L 23/08; C08L 23/16
[52] U.S. Cl. .................................. 525/240; 525/53; 525/324; 525/320; 525/322; 525/222; 525/227
[58] Field of Search ....................... 525/240, 53, 324

[56] References Cited

U.S. PATENT DOCUMENTS

| | | | |
|---|---|---|---|
| 4,438,238 | 3/1984 | Fukushima et al. | 525/240 |
| 4,705,829 | 11/1987 | Kwack et al. | 525/240 |
| 4,975,485 | 12/1990 | Sato et al. | 525/240 |
| 5,102,955 | 4/1992 | Calabra et al. | 525/240 |
| 5,126,398 | 6/1992 | Lee et al. | 525/53 |

Primary Examiner—Carman J. Seccuro, Jr.
Attorney, Agent, or Firm—Yahwak & Associates

[57] ABSTRACT

A polyethylene composition which has excellent flow characteristics and mechanical properties, especially low temperature mechanical properties as well as thermal stability, elasticity and workability for molding. The polyethylene composition comprises 20 to 80 wt. % of an ethylene-α-olefin copolymer of higher molecular weight having (a) intrinsic viscosity ($\eta_1$) of 1.2 to 9.0 dl/g, (b) density ($d_1$) of 0.890 to 0.935 g/cm$^3$ (c) a specific areal ratio calculated with an elution temperature-eluate volume curve in elution fractionation, and (d) a specific quantity of the content which is soluble in 25° C. o-dichlorobenzene, and 80 to 20 wt. % of ethylene homopolymer or ethylene-α-olefin copolymer of lower molecular weight having (e) intrinsic viscosity ($\eta_2$) of 0.2 to 1.6 dl/g, (f) density ($d_2$) of 0.890 to 0.980 g/cm$^3$ and, wherein the above ($\eta_1$) is larger than ($\eta_2$), and the prepared composition has an intrinsic viscosity ($\eta$) of 0.77 to 5.2 dl/g, a density (d) of 0.890 to 0.950 g/cm$^3$ and a specific N-value of 1.7 to 3.5.

5 Claims, 8 Drawing Sheets

POLYETHYLENE COMPOSITION

BACKGROUND OF THE INVENTION (1) Field of the Invention

The present invention relates to a novel polyethylene composition. More particularly, the invention relates to a polyethylene composition which has a wide molecular weight distribution, good fluidity and excellent mechanical properties at low temperatures. Furthermore, the polyethylene composition of the invention comprises a high molecular weight ethylene-α-olefin copolymer having a very wide distribution of short branched chains among molecules and a relatively low molecular weight ethylene homopolymer or ethyl-α-olefin copolymer, which composition excels in melt elasticity, flow characteristics and mechanical properties, especially in low temperature conditions.

(2) Description of the Prior Art

The conventional high-pressure low density polyethylene (HP-LDPE) is prepared by radically polymerizing ethylene at high pressures and high temperatures in tubular reactors or autoclaves. This HP-LDPE has long branched chains which are equal to the length of main chains and short branched chains of alkyl groups having 1 to 6 carbon atoms. Accordingly, the HP-LDPE is soft and low in crystallinity. For this reason, the HP-LDPE is worse in mechanical properties such as environmental stress cracking resistance, tensile impact value, dart impact value and tear strength. It is inferior in the mechanical strength especially at low temperatures.

On the other hand, the linear low density polyethylene (LLDPE) is an ethylene-α-olefin copolymer which is produced under various polymerization conditions with various catalysts through several processes such as gas phase polymerization, slurry polymerization, solution polymerization and high pressure ion polymerization. The mechanical properties of LLDPE is superior to those of HP-LDPE because the former LLDPE has only short branched chains which depend upon the kind of used α-olefin.

However, because the molecular weight distribution of LLDPE is generally very narrow, it is worse in melt elasticity such as melt tension and flow characteristics such as N-value, flow parameter and critical shear velocity. The defects in the melt elasticity and flow characteristics have influences on workability in forming process. More particularly, there are several problems in the forming process concerning the smaller extrusion quantity, higher extrusion pressure, larger electric power consumption, insufficient high speed forming property, occurrence of fish eyes, roughness in the surfaces of formed products, and thermal deterioration caused by the excess heat generation in extruders.

When the molecular weight is made low in order to improve the flow characteristics of LLDPE, there occurs several defects in the lowering of mechanical properties such as impact strength and environmental stress cracking resistance, especially in the lowering of low temperature mechanical strength and melt elasticity. Furthermore, when the density is made lower for the purpose of improving mechanical properties, the melt elasticity can hardly be improved.

As described above, it has been quite difficult to improve the mechanical properties, especially low temperature mechanical properties, and flow characteristics and melt elasticity, simultaneously.

In the conventional art, there are proposed some methods to widen the molecular weight distribution of ethylene-α-olefin copolymer in order to improve the flow characteristics (e.g. Japanese Laid-Open Patent Publication No. Sho 57-21409 and Japanese Patent Publication No. Sho 63-47741). Even when the molecular weight distribution is widened like the proposed methods, however, the melt elasticity and mechanical properties, especially low temperature mechanical properties, cannot be improved but they are made worse seriously.

Furthermore, concerning the improvement in mechanical properties and flow characteristics in an ethylene-α-olefin copolymer which is composed of high molecular weight components and low molecular weight components, it was tried to improve not only the mechanical properties and flow characteristics but also the environmental stress cracking resistance (ESCR) by specifying the degree of short chain branching in high molecular weight components and by introducing a large quantity of short branched chains into the high molecular weight components (Japanese Laid-Open Patent Publication No. Sho 54-100444 and Japanese Patent Publication No. Sho 64-7096). The improvement to some extent can be attained in the above methods because the mechanical properties, especially the low temperature mechanical properties, are largely dependent upon the distribution of short branched chains in high molecular weight components. The methods are, however, still unsatisfactory in view of the measure to improve the mechanical properties and flow characteristics, especially those in low temperature conditions.

BRIEF SUMMARY OF THE INVENTION

In view of the state of the art mentioned above, it is the principal aspect of the present invention to provide a polyethylene composition which is excellent in melt elasticity, flow characteristics and mechanical properties, especially low temperature mechanical properties, which problems have never been solved in the conventional art.

Pursuant to the above aspect the inventors of the present invention have carried out extensive investigations, and as a result, a polyethylene composition which meets the requirement in melt elasticity, flow characteristics and mechanical properties, especially low temperature mechanical properties was produced thereby accomplishing the present invention.

According to the present invention, the novel polyethylene composition comprises:

(I) 20 to 80 wt. % of a copolymer of ethylene and α-olefins having 3 to 18 carbon atoms, which copolymer meets the following conditions (a) to (d):
   (a) intrinsic viscosity ($\eta_1$) 1.2 to 9.0 dl/g
   (b) density ($d_1$): 0.890 to 0.935 g/cm$^3$
   (c) in the elution temperature-eluate volume curve in continuously temperature rising elution fractionation, the ratio S (Ib/Ia) of the area Ib under the curve of elution temperature of 25° to 90° C. to the area Ia under the curve of elution temperature of 90° C. and above, is not larger than the value $S_1$ which is calculated with the following equation, $$S_1 = \eta_1^{-1} \exp[-50(d_1 - 0.900)]$$

(d) the quantity W wt. % of the content which is soluble in 25° C. o-dichlorobenzene is not smaller than the the value $W_1$ which is calculated with the following equation, $$W_1 = 20 \exp(-\eta_1)$$

and (II) 80 to 20 wt. % of ethylene homopolymer and/or the copolymer of ethylene and α-olefins having 3 to 18 carbon atoms, which meet the following conditions (e) and (f), (e) intrinsic viscosity ($\eta_2$): 0.2 to 1.6 dl/g
(f) density ($d_2$): 0.890 to 0.980 g/cm$^3$ the value ($\eta_1$) is larger than ($\eta_2$), and the intrinsic viscosity ($\eta$) of the composition is 0.77 to 5.2 dl/g, the density (d) thereof is 0.890 to 0.950 g/cm$^3$ and the N-value calculated with the following equation is 1.7 to 3.5.

$$N\text{-Value} = \frac{\log(\dot{\gamma}_{150}/\dot{\gamma}_{20})}{\log(\tau_{150}/\tau_{20})}$$

wherein "$\dot{\gamma}$" is an apparent shear rate (sec$^{-1}$ at 170° C.) and "$\tau$" is an apparent shear stress (dyne/cm$^2$ at 170° C.) and the subscripts "20" and "150" indicate loads of 20 kg/cm$^2$ and 150 kg/cm$^2$, respectively.

BRIEF DESCRIPTION OF THE DRAWINGS

These and other desirable aspects and features of the invention will become more apparent from the following description taken in connection with the accompanying drawings, in which.

DETAILED DESCRIPTION OF THE INVENTION

Figure 1:
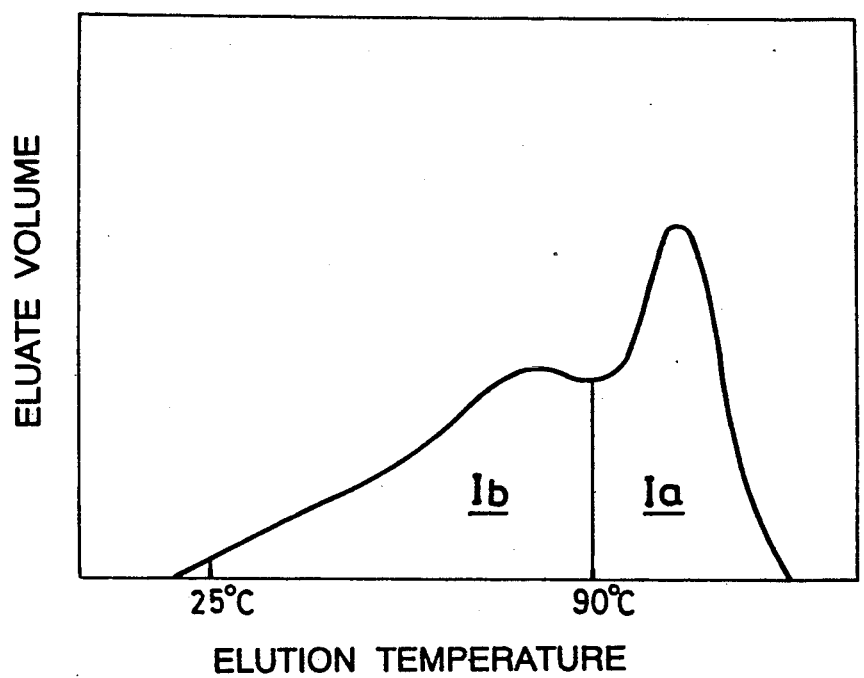
FIG. 1 is a graph showing an elution temperature-eluate volume curve in continuous temperature rising fractionation (TREF,) method to obtain an areal ratio S.

In the following, the present invention will be described in more detail with reference to several examples.

The ethylene-α-olefin copolymer as the higher molecular weight component (I) in the present invention comprises the copolymer of ethylene and α-olefins having 3 to 18 carbon atoms. The α-olefins having 4 to 10 carbon atoms are preferable in view of mechanical properties. More particularly, the α-olefin is exemplified by 1-butene, 1-pentene, 1-hexene, 4-methyl-1-pentene, 1-heptene, 1-octene, 1-nonene and 1-decene. These α-olefins can be used as a mixture of two or more kinds.

The (a) intrinsic viscosity ($\eta_1$) of the ethylene; α-olefin copolymer as the higher molecular weight component (I) is in the range of 1.2 to 9.0 dl/g, preferably 1.4 to 8.5 dl/g, and more preferably 1.6 to 8.0 dl/g. When the value $\eta_1$ is smaller than 1.2 dl/g, the melt elasticity and mechanical properties are worse. On the other hand, when the value $\eta_1$ is larger than 9.0 dl/g, the workability is worse with the occurrence of surface roughening and fish eyes.

The (b) density ($d_1$) of the component (I) is in the range of 0.890 to 0.935 g/cm$^3$, preferably 0.890 to 0.930 g/cm$^3$. When the density ($d_1$) is lower than 0.890 g/cm$^3$, it is undesirable because the forming operation is difficult and the composition is tacky. On the other hand, when the ($d_1$) is higher than 0.935 g/cm$^3$, the melt elasticity and mechanical properties are undesirably worse.

As mentioned in the foregoing item (c), the distribution of branched chain in the composition (I) is measured in view of the dissolving temperature in a solvent according to Temperature Rising Elution Fractionation (TREF) of L. Wild et al. (Journal of Polymer Science, Polymer Physics Edition, Vol. 20, 441–455 (1982)). It is necessary that, in the elution temperature-eluate volume curve in TREF method, the area Ib under the curve of elution temperature of 25° to 90° C. and the area Ia under the curve of elution temperature above 90° C. must have a specific relationship. That is, the areal ratio (S=Ib/Ia) in the schematically illustrated FIG. 1 must not exceed the value $S_1$ which is calculated with the following equation.

$$S_1 = 20\,\eta_1^{-1} \exp[-50(d_1-0.900)]$$

When the value S exceeds the value $S_1$, it is not desirable in that the distribution of branched chains become almost even resulting in the decrease of highly branched components which is quite effective to improve the melt elasticity and mechanical properties, especially low temperature mechanical properties.

In the component (I) of the present invention, the content (d) which is soluble in 25° C. o-dichlorobenzene (ODCB) indicates the quantity of component which contains branched chains of a very large quantity to the extent that it cannot be determined by the continuously temperature rising elution fractionation because the elution temperature is too low. This value must be larger than a certain value. That is, it is necessary that the quantity of soluble content W wt. % is not smaller than the value $W_1$, preferably larger than $W_2$ which are calculated with the following equations:

$$W_1 = 20 \exp(-\eta_1)$$

$$W_2 = 22 \exp(-\eta_2)$$

When the value (W) is smaller than $W_1$, it is not desirable as described above because the quantity of highly branched component which is largely effective to the melt elasticity and mechanical properties, especially low temperature mechanical properties, is small.

The lower molecular weight component (II) of the present invention is ethylene homopolymer or the copolymer of ethylene and α-olefins. In the like manner as the component (I), the α-olefin for preparing the ethylene-α-olefin is those having 3 to 18 carbon atoms, preferably 4 to 10 carbon atoms. In view of mechanical properties, preferable α-olefins are exemplified by 1-butene, 1-pentene, 1-hexene, 4-methyl-1-pentene, 1-heptene, 1-octene, 1-nonene and 1-decene. These α-olefins can also be used as a mixture of two or more kinds.

The value (e) of intrinsic viscosity ($\eta$) of the above component (II) is in the range of 0.2 to 1.6 dl/g, preferably 0.3 to 1.5 dl/g and more preferably 0.4 to 1.4 dl/g. When the value $\eta$ is lower than 0.2 dl/g, the mechanical properties, especially low temperature mechanical properties of the obtained composition are worse. On the other hand, when it exceeds 1.6 dl/g, the flow characteristics are low, which is not desirable either.

The value (f) of density ($d_2$) of the component (II) is in the range of 0.890 to 0.980 g/cm$^3$, preferably 0.900 to 0.976 g/cm$^3$. When $d_2$ is smaller than 0.890 g/cm$^3$, it is not desirable because the plastics forming operation is difficult and the composition is tacky. On the other hand, when the density ($d_2$) is higher than 0.980 g/cm$^3$, not only the forming operation is difficult but also the mechanical properties of the composition is not good.

The compounding ratios of both the components in the present invention are 20 to 80 wt. % of component (I) and 80 to 20 wt. % of component (II), preferably 30 to 70 wt. % and 70 to 30 wt. %, respectively. When the quantity of component (I) is smaller than 20 wt. %, the melt elasticity and mechanical properties, especially low temperature mechanical properties, are worse. Meanwhile, when the quantity of component (II) is larger than 80 wt. %, the flow characteristics is worse. Accordingly, the compositions in both the outside of the above range cannot be used.

When the component (I) and component (II) are mixed together, it is necessary that the intrinsic viscosity of the component (I) is larger than that of the component (II). If the components do not meet this condition, it is difficult to attain the object of the present invention to improve the mechanical properties at low temperatures.

As described above, the composition of the present invention can be prepared by mixing both the components (I) and (II), in which the properties of the composition after mixing must meet specific ranges. That is, the intrinsic viscosity ($\eta$) of the polyethylene composition must be in the range of 0.77 to 5.2 dl/g, preferably 1 to 4 dl/g. When the value ($\eta$) is lower than 0.77 dl/g, the melt viscosity and mechanical properties, especially low temperature mechanical properties are worse and when it exceeds 5.2 dl/g, flow characteristics are low, both of which are not desirable.

The density (d) of the polyethylene composition is in the range of 0.890 to 0.950 g/cm$^3$, preferably 0.900 to 0.940 g/cm$^3$. When the density (d) is lower than 0.890 g/cm$^3$, it is not desirable because the forming operation is difficult and the composition is tacky. On the other hand, when the density (d) is higher than 0.950 g/cm$^3$, mechanical properties such as tensile impact strength is low.

It is necessary that the N-value of polyethylene composition is in the range of 1.7 to 3.5, preferably 1.7 to 3.0. When the N-value is lower than 1.7, the high speed forming is difficult. When the N-value is higher than 3.5, melt fracture is liable to occur.

The method to formulate the polyethylene composition of the present invention is not especially limited. For example, the component (I) and the component (II) are prepared separately through one-step polymerization process and they are then mixed together by a conventional method. The polyethylene composition may also be prepared by the conventionally known two-step polymerization process or by multi-step polymerization process.

In the former preparation by mixing, any known method can be adopted by using a uniaxial extruder, biaxial extruder or Banbury mixer or by solution mixing method.

In the above-mentioned multi-step polymerization method, a plurality of reactors are used. For example, a first reactor is set to the polymerization conditions for the higher molecular weight ethylene-α-olefin of the component (I) and a second reactor is set to the polymerization conditions for the lower molecular weight polymer of the component (II). The polymerization product from the first reactor is continuously passed into the second reactor to obtain the polyethylene composition of the present invention. In this procedure, each component (I) or (II) may be prepared in any of reactors. That is, preparation can be carried out in arbitrary order and number of steps.

In the above process, the type of reaction is not limited, for example, any of slurry method, gas phase method, solution method and high pressure ionic method can be employed. The polymerization catalyst is not limited either. For example, any of Ziegler catalyst, Phillips catalyst and Kaminsky catalyst can be used. Among several catalysts, a most desirable one is highly active Ziegler catalyst being carried on a solid carrier, which will be described in more detail.

The highly active Ziegler catalyst comprises a solid component of transition metal compound which is carried on an inorganic solid carrier. The inorganic solid carriers are exemplified by metallic magnesium, magnesium hydroxide, magnesium carbonate, magnesium oxide, magnesium chloride, several kinds of alumina, silica, and silica-alumina, or double salts or double oxides, hydrates of carbonates and hydrates of silicates containing magnesium and one member selected from the group consisting of silicon, aluminum and calcium, and the substances which are prepared by treating or reacting these inorganic solid carriers with oxygen-containing compounds, sulfur-containing compounds, hydrocarbons or halogen-containing compounds. The transition metal compounds are exemplified by halides, alkoxyhalides, oxides and halogenated oxides of transition metals such as titanium, vanadium, zirconium and chromium, or combinations of these compounds with organometallic compounds of metals of Group I to IV of the periodic table, and preferably organo-zinc compounds or organo-aluminum compounds, or the substances which are prepared by pretreating the above exemplified materials with α-olefins. The catalytic activity is generally more than 50 g-polymer/g-catalyst.hr.kg/cm$^2$-olefin pressure, preferably more than 100 g-polymer/g-catalyst.hr.kg/cm$^2$-olefin pressure.

Within the scope of the present invention, any conventionally know additive can be incorporated into the polyethylene composition. The additives are exemplified by other olefinic polymers such as high, medium and low density polyethylene, ethylene-vinyl acetate copolymer, ethylene-ethylacrylate copolymer, ethylene-ethylmethacrylate copolymer and polypropylene, rubber, antioxidant, UV absorber, light stabilizer, lubricant, antistatic agent, antiblocking agent, processing aid and coloring pigment.

In the following, the present invention will be described in more detail with reference to several examples. The preferred embodiments described herein are illustrative and not restrictive, the scope of the invention being indicated by the appended claims and all variations which come within the meaning of the claim are intended to be embraced therein.

In the first place, the test methods employed herein are described.

(1) Intrinsic viscosity

The value of ($\eta$) was measured in 135° C. decalin solution.

(2) Density

Measured by density gradation tube method at 23° C. according to JIS K 6760.

(3) Continuously temperature rising fractionation method (TREF)

Measured according to L. Wild's method as mentioned in the foregoing paragraph.

(4) Ratio (S) of areas in TREF

Measured according to the foregoing paragraph with FIG. 1.

(5) Component (W) soluble in o-dichlorobenzene at 25° C.

A test sample (0.5 g) was heated for 2 hours in 20 ml of 135° C. o-dichlorobenzene (ODCB) to dissolve the sample completely, which was followed by cooling to 25° C. in 2 hours. This solution was left to stand still at 25° C. for one night and was filtered through a Teflon filter. The filtrate was analyzed by an infrared spectrometer to obtain the absorption at a wave number of 2,950 cm$^{-1}$ corresponding to the asymmetrical vibration of methylene. The concentration in the sample was determined with an obtained result in comparison with a previously made calibration curve.

(6) N-value

Measured with a flowtester (Shimadzu Capillary Rheometer made by Shimadzu Corp., Ltd.) Test sample was extruded through a die of 2 mm$\phi \times 40$ mm at 170° C. for the material of MFR of 0.1 or higher and at 210° C. for the material of MFR of lower than 0.1 to obtain apparent shear rates at a low test pressure of 20 kg/cm$^2$ and a high test pressure of 150 kg/cm$^2$ and N-value was calculated with the following equation.

$$N\text{-Value} = \frac{\log (\dot{\gamma}_{150}/\dot{\gamma}_{20})}{\log (\tau_{150}/\tau_{20})}$$

wherein "$\dot{\gamma}$" is an apparent shear rate (sec$^{-1}$ at 170° C.) and "$\tau$" is an apparent shear stress (dyne/cm$^2$ at 170° C.) and the subscripts "20" and "150" indicates loads of 20 kg/cm$^2$ and 150 kg/cm$^2$, respectively.

(7) Melt flow rate (MFR)

Measured the value of MFR according to JIS K 6760 at 190° C. with 2.16 kg load.

(8) High load melt flow rate (HLMFR)

Measured the value of HLMFR according to JIS K 6760 at 190° C. with 2.16 kg load.

(9) Flow parameter

The value of FP was calculated with the following equation.

$$FP = \log (HLMFR/MFR)$$

(10) Yield tensile strength (YTS)

Measured according to JIS K 6760 at a tensile rate of 50 mm/min with test pieces of 2 mm in thickness.

(11) Tensile impact strength (TIS)

Measured according to ASTM D 1822 with test pieces of 2 mm in thickness.

(12) Izod Impact Strength (IIS)

Measured according to JIS K 7110 at 23° C. and −40° C. Sheets of 3 mm thick for measurement at 23° C. and of 4 mm thick for measurement at −40° C. were made from a test sample using a press. The size of test pieces was No. 2-A. The test pieces were conditioned at 23° C. and 50% humidity for 88 hours and were used for the tests at 23° C. and −40° C. Meanwhile, the test pieces for use in −40° C. test were further conditioned by placing them in an air bath at −40° C. for about 3 hours and were subjected to the test without delay. The number of test pieces were five and an average of five test results were taken, respectively.

(13) Flexural Strength

Measured according to JIS K 7106 using a flexural strength testing machine made by Toyo Seiki Seisaku-sho, Ltd.

(14) Melt tension (MT)

Measured at 190° C. using a melt tension tester made by Toyo Seiki Seisaku-sho, Ltd.

(15) Critical shear rate ($\gamma_1$)

Measured at 190° C. using a capillary rheometer made by International Technology & Science Corp.

(16) Melting point ($T_m$)

Measured by using a differentially scanning calorimeter made by Rigaku Corp. and the data indicated are the temperature of the maximum peak. Test pieces were made of pressed sheets of 0.2 mm thick.

(17) Spiral flow length

Test pieces were made by injection molding at an injection temperature of 230° C. and an injection pressure of 1,000 kg/cm$^2$ using a metal mold having a certain spiral cavity with an injection molding machine (IS 100 EN made by Toshiba Machine Co., Ltd.) The melt flow property was determined by measuring the lengths of molded spirals.

(18) Environmental stress cracking resistance (ESCR)

Measured according to JIS K 6760 and the value of F$_{50}$ of constant strain ESCR was indicated.

EXAMPLE 1

Figure 2:
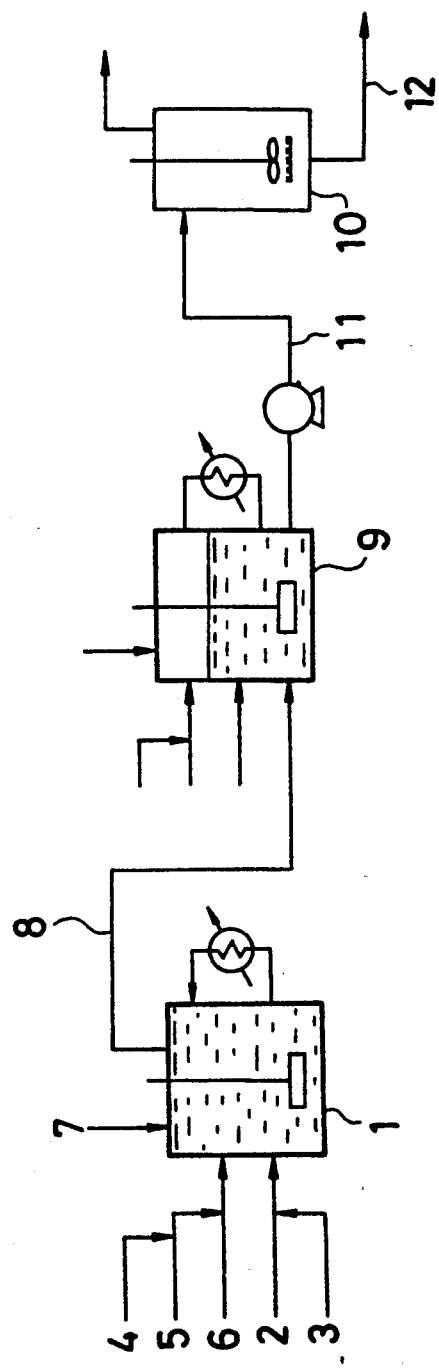
FIG. 2 is a flow sheet of two-step polymerization process used in the examples of the present invention.

A two-step polymerization process is shown in FIG. 2. A 30 liter reaction vessel equipped with a stirrer was used as a first step reactor 1. The used solid catalyst was titanium tetrachloride being supported on a solid carrier containing a component of anhydrous magnesium chloride. This catalyst was fed through a line 2 and a promoter of triethyl aluminum (TEA) was fed through a line 3. Starting materials of ethylene and 1-butene were continuously polymerized under the polymerization conditions shown in Table 1. In the drawing, the numeral 4 denotes an ethylene feeding line, 5 a 1-butene feeding line, 6 a hydrogen feeding line, and 7 a solvent feeding line. The polymerization conditions in the first step reactor 1 were 60° C. in temperature and 8.8 kg/cm$^2$G in total pressure and the inside of the reactor was filled with liquid. The quantity E$_1$ of polymerization product calculated from heat balance was 1.59 kg. A part of polymerization product was taken out from the first step reactor and properties of recovered polymer were analyzed, the results of which are shown in Table 5A.

The polymerization product in slurry from the first step reactor 1 was introduced into a 70 liter second step reactor 9 through a line 8. As shown in Table 1, ethylene, 1-butene and hydrogen were additionally fed and polymerization was continued at a polymerization temperature of 65° C., a total pressure of 8.6 kg/cm$^2$G and a liquid phase volume of 50 liter. The polymerization product taken out from the second reactor 9 was then introduced into a flashing vessel 10 through a line 11.

The polymerization product was recovered continuously from a line 12 and subjected to analysis, the results of which are shown in the following Table 5A.

The quantity E of the finally recovered polymerization product was 3.38 kg, which coincided with the calculated value of $E_1+E_2$. The average polymerization times of the first step reactor 1 and the second step reactor 9 were 25 minutes and 40 minutes, respectively.

EXAMPLES 2 TO 17 AND COMPARATIVE EXAMPLES 1 TO 6

In the like manner as in Example 1, two-step polymerization was carried out with changing the kind of α-olefin and polymerization conditions. The polymerization conditions are shown in Tables 1 to 4 and the results of property tests are shown in Table 5A to 8B.

TABLE 1

| | | Two Step Polymerization Conditions (1) | | | | | |
|---|---|---|---|---|---|---|---|
| | | Examples | | | | | |
| Items | Units | 1 | 2 | 3 | 4 | 5 | 6 |
| First Step Polymerization (Higher Molecular Weight) | | | | | | | |
| Qty. of Solvent | l/hr | 70 | 70 | 70 | 70 | 70 | 70 |
| Qty. of Ethylene | kg/hr | 1.7 | 2.0 | 1.7 | 1.7 | 2.2 | 2.0 |
| Qty. of Comonomer | l/hr | 1.7 | 6.7 | 2.0 | 2.9 | 4.9 | 2.7 |
| Kind of Comonomer | — | $C_4$ | $C_4$ | $C_4$ | $C_6$ | $C_6$ | $C_4$ |
| Qty. of Hydrogen | Nl/hr | 3.7 | 3.5 | 3.2 | 2.7 | 4.0 | 4.1 |
| Qty. of Solid Catalyst | g/hr | 0.9 | 1.2 | 1.2 | 1.2 | 1.2 | 0.9 |
| Qty. of Promoter (TEA) | mmol/hr | 21 | 21 | 21 | 21 | 21 | 21 |
| Polymerization Temperature | °C. | 60 | 60 | 60 | 65 | 60 | 60 |
| Polymerization Pressure | kg/cm$^2$G | 8.8 | 7.4 | 8.7 | 9.3 | 10.8 | 8.4 |
| Polymerization Time | min | 25 | 25 | 25 | 25 | 25 | 25 |
| Second Step Polymerization (Lower Molecular Weight) | | | | | | | |
| Additional Qty. of Ethylene | kg/hr | 1.3 | 1.1 | 1.6 | 2.0 | 1.3 | 1.8 |
| Additional Qty. of Comonomer | l/hr | 1.8 | 0 | 19 | 0 | 2.3 | 2.3 |
| Kind of Additional Comonomer | — | $C_4$ | — | $C_4$ | — | $C_6$ | $C_4$ |
| Additional Qty. of Hydrogen | Nl/hr | 98 | 82 | 145 | 120 | 187 | 130 |
| Ratio of Hydrogen/ethylene in Gas Phase Section | by mole | 2.33 | 1.87 | 2.90 | 2.22 | 2.69 | 2.17 |
| Ratio of Comonomer/Ethylene in Gas Phase Section | by mole | 0.22 | 0.19 | 0.20 | 0.11 | 0.28 | 0.25 |
| Polymerization Temperature | °C. | 65 | 65 | 65 | 70 | 65 | 65 |
| Polymerization Pressure | kg/cm$^2$G | 8.6 | 7.1 | 8.5 | 9.1 | 10.5 | 8.2 |
| Polymerization Time | min | 40 | 40 | 40 | 40 | 40 | 40 |

TABLE 2

| | | Two Step Polymerization Conditions (2) | | | | | |
|---|---|---|---|---|---|---|---|
| | | Examples | | | | | |
| Items | Units | 7 | 8 | 9 | 10 | 11 | 12 |
| First Step Polymerization (Higher Molecular Weight) | | | | | | | |
| Qty. of Solvent | l/hr | 70 | 70 | 70 | 70 | 70 | 70 |
| Qty. of Ethylene | kg/hr | 1.7 | 1.8 | 1.8 | 2.0 | 1.3 | 1.2 |
| Qty. of Comonomer | l/hr | 1.4 | 1.0 | 2.0 | 8.3 | 0.43 | 0.43 |
| Kind of Comonomer | — | $C_6$ | $C_4$ | $C_4$ | $C_4$ | $C_4$ | $C_4$ |
| Qty. of Hydrogen | Nl/hr | 2.6 | 3.8 | 4.4 | 3.6 | 13 | 14 |
| Qty. of Solid Catalyst | g/hr | 0.9 | 0.9 | 0.9 | 1.5 | 1.0 | 1.0 |
| Qty. of Promoter (TEA) | mmol/hr | 21 | 21 | 21 | 21 | 21 | 21 |
| Polymerization Temperature | °C. | 65 | 65 | 60 | 55 | 70 | 70 |
| Polymerization Pressure | kg/cm$^2$G | 11.5 | 11.0 | 8.5 | 8.2 | 8.0 | 8.2 |
| Polymerization Time | min | 25 | 25 | 25 | 25 | 25 | 25 |
| Second Step Polymerization (Lower Molecular Weight) | | | | | | | |
| Additional Qty. of Ethylene | kg/hr | 1.9 | 1.9 | 1.3 | 1.8 | 2.8 | 2.8 |
| Additional Qty. of Comonomer | l/hr | 0 | 0 | 1.8 | 2.5 | 0 | 0 |
| Kind of Additional Comonomer | — | — | — | $C_4$ | $C_4$ | — | — |
| Additional Qty. of Hydrogen | Nl/hr | 130 | 195 | 103 | 113 | 138 | 130 |
| Ratio of Hydrogen/ethylene in Gas Phase Section | by mole | 2.08 | 2.10 | 2.50 | 2.40 | 1.48 | 1.41 |
| Ratio of Comonomer/Ethylene in Gas Phase Section | by mole | 0.086 | 0 | 0.21 | 0.34 | 0.028 | 0.020 |
| Polymerization Temperature | °C. | 70 | 70 | 70 | 60. | 80 | 80 |
| Polymerization Pressure | kg/cm$^2$G | 11.2 | 10.7 | 8.3 | 8.0 | 7.8 | 8.0 |
| Polymerization Time | min | 40 | 40 | 40 | 40 | 40 | 40 |

TABLE 3

| | | Two Step Polymerization Conditions (3) | | | | |
|---|---|---|---|---|---|---|
| | | Examples | | | | |
| Items | Units | 13 | 14 | 15 | 16 | 17 |
| First Step Polymerization | | | | | | |

TABLE 3-continued

Two Step Polymerization Conditions (3)

| Items | Units | Examples 13 | 14 | 15 | 16 | 17 |
|---|---|---|---|---|---|---|
| (Higher Molecular Weight) | | | | | | |
| Qty. of Solvent | l/hr | 70 | 70 | 70 | 70 | 70 |
| Qty. of Ethylene | kg/hr | 1.3 | 1.3 | 1.2 | 1.0 | 1.0 |
| Qty. of Comonomer | l/hr | 0.90 | 2.8 | 1.2 | 0.52 | 0.51 |
| Kind of Comonomer | — | $C_6$ | $C_4$ | $C_4$ | $C_4$ | $C_4$ |
| Qty. of Hydrogen | Nl/hr | 12 | 3.0 | 5.0 | 8.0 | 13 |
| Qty. of Solid Catalyst | g/hr | 1.0 | 0.45 | 0.45 | 0.9 | 0.75 |
| Qty. of Promoter (TEA) | mmol/hr | 21 | 21 | 21 | 21 | 21 |
| Polymerization Temperature | °C. | 70 | 60 | 60 | 70 | 70 |
| Polymerization Pressure | kg/cm$^2$G | 8.2 | 7.0 | 9.1 | 14.2 | 10.0 |
| Polymerization Time | min | 25 | 25 | 25 | 25 | 25 |
| Second Step Polymerization (Lower Molecular Weight) | | | | | | |
| Additional Qty. of Ethylene | kg/hr | 2.8 | 2.7 | 1.9 | 2.8 | 1.8 |
| Additional Qty. of Comonomer | l/hr | 0 | 1.1 | 1.4 | 0 | 0 |
| Kind of Additional Comonomer | — | — | $C_4$ | $C_4$ | — | — |
| Additional Qty. of Hydrogen | Nl/hr | 136 | 50 | 105 | 160 | 95 |
| Ratio of Hydrogen/ethylene in Gas Phase Section | by mole | 1.45 | 0.75 | 2.32 | 1.21 | 1.41 |
| Ratio of Comonomer/Ethylene in Gas Phase Section | by mole | 0.027 | 0.10 | 0.20 | 0.034 | 0.043 |
| Polymerization Temperature | °C. | 80 | 70 | 70 | 80 | 80 |
| Polymerization Pressure | kg/cm$^2$G | 8.0 | 6.8 | 8.9 | 14.0 | 9.8 |
| Polymerization Time | min | 40 | 40 | 40 | 40 | 40 |

TABLE 4

Two Step Polymerization Conditions (4)

| Items | Units | Comparative Examples 1 | 2 | 3 | 4 | 5 | 6 |
|---|---|---|---|---|---|---|---|
| First Step Polymerization (Higher Molecular Weight) | | | | | | | |
| Qty. of Solvent | l/hr | 70 | 70 | 70 | 70 | 70 | 70 |
| Qty. of Ethylene | kg/hr | 2.2 | 2.2 | 2.2 | 2.3 | 2.3 | 2.3 |
| Qty. of Comonomer | l/hr | 0.12 | 0.14 | 0.15 | 0.13 | 0.13 | 0.15 |
| Kind of Comonomer | — | $C_4$ | $C_4$ | $C_6$ | $C_4$ | $C_4$ | $C_4$ |
| Qty. of Hydrogen | Nl/hr | 18.8 | 20.5 | 20.4 | 6.3 | 7.3 | 7.3 |
| Qty. of Solid Catalyst | g/hr | 0.9 | 0.9 | 0.9 | 0.9 | 0.9 | 0.9 |
| Qty. of Promoter (TEA) | mmol/hr | 21 | 21 | 21 | 42 | 42 | 42 |
| Polymerization Temperature | °C. | 60 | 60 | 60 | 70 | 70 | 70 |
| Polymerization Pressure | kg/cm$^2$G | 12.0 | 11.9 | 11.6 | 12.4 | 12.9 | 12.1 |
| Polymerization Time | min | 25 | 25 | 25 | 25 | 25 | 25 |
| Second Step Polymerization (Lower Molecular Weight) | | | | | | | |
| Additional Qty. of Ethylene | kg/hr | 1.1 | 1.1 | 1.0 | 1.3 | 1.3 | 1.3 |
| Additional Qty. of Comonomer | l/hr | 4.5 | 5.2 | 6.4 | 0 | 0 | 0 |
| Kind of Additional Comonomer | — | $C_4$ | $C_4$ | $C_6$ | — | — | — |
| Additional Qty. of Hydrogen | Nl/hr | 238 | 220 | 172 | 273 | 244 | 239 |
| Ratio of Hydrogen/ethylene in Gas Phase Section | by mole | 2.19 | 2.20 | 2.20 | 2.18 | 2.43 | 2.50 |
| Ratio of Comonomer/Ethylene in Gas Phase Section | by mole | 0.20 | 0.24 | 0.34 | 0 | 0 | 0 |
| Polymerization Temperature | °C. | 65 | 65 | 65 | 80 | 80 | 80 |
| Polymerization Pressure | kg/cm$^2$G | 11.8 | 11.6 | 11.3 | 12.1 | 12.5 | 11.8 |
| Polymerization Time | min | 40 | 40 | 40 | 40 | 40 | 40 |

TABLE 5A

Physical Properties in Two-Step Polymerization (1A)

| Items | | Units | Examples 1 | 2 | 3 | 4 | 5 | 6 |
|---|---|---|---|---|---|---|---|---|
| (Higher Molecular Weight Components A) | | | | | | | | |
| Intrinsic Viscosity | $\eta_1$ | dl/g | 4.3 | 4.6 | 5.4 | 5.3 | 5.9 | 5.0 |
| Density | $d_1$ | g/cm$^3$ | 0.916 | 0.904 | 0.913 | 0.909 | 0.910 | 0.913 |
| Qty. Prepared | $E_1$ | kg/hr | 1.59 | 2.04 | 1.71 | 1.71 | 1.95 | 2.26 |
| Percentage | $X_1$ | wt. % | 47 | 56 | 45 | 41 | 51 | 49 |
| Ratio of Areas with TREF | S | — | 1.0 | 3.0 | 1.4 | 1.9 | 1.3 | 1.4 |
| Qty. soluble in 25° C. ODCB | W | wt. % | 2.6 | 17.8 | 4.7 | 9.8 | 6.4 | 4.8 |
| $S_1$ | | — | 2.09 | 3.6 | 1.9 | 2.4 | 2.1 | 2.1 |
| $W_1$ | | wt. % | 0.27 | 0.20 | 0.09 | 0.10 | 0.05 | 0.13 |
| (Lower Molecular Weight Components B) | | | | | | | | |

TABLE 5A-continued

Physical Properties in Two-Step Polymerization (1A)

| Items | | Units | Examples 1 | 2 | 3 | 4 | 5 | 6 |
|---|---|---|---|---|---|---|---|---|
| Intrinsic Viscosity | $\eta_2$ | dl/g | 0.83 | 0.54 | 0.36 | 0.61 | 0.38 | 0.45 |
| Density | $d_2$ | g/cm$^3$ | 0.917 | 0.931 | 0.926 | 0.945 | 0.922 | 0.923 |
| Qty. Prepared | $E_2$ | kg/hr | 1.79 | 1.60 | 2.12 | 2.45 | 1.88 | 2.33 |
| Percentage | $X_2$ | wt. % | 53 | 44 | 55 | 59 | 49 | 51 |

TABLE 5B

Physical Properties in Two-Step Polymerization (1B)

| Items | | Units | Examples 1 | 2 | 3 | 4 | 5 | 6 |
|---|---|---|---|---|---|---|---|---|
| (Polyethylene Composition) | | | | | | | | |
| Qty. Prepared | E | kg/hr | 3.38 | 3.64 | 3.38 | 4.16 | 3.83 | 4.59 |
| Intrinsic Viscosity | $\eta$ | dl/g | 2.46 | 2.81 | 2.63 | 2.53 | 3.20 | 2.68 |
| Melt Flow Rate | MFR | g/10 min | 0.11 | 0.048 | 0.073 | 0.092 | 0.022 | 0.065 |
| Density | d | g/cm$^3$ | 0.917 | 0.916 | 0.920 | 0.930 | 0.916 | 0.918 |
| N-Value | | — | 2.45 | 2.52 | 2.82 | 2.68 | 2.87 | 2.63 |
| Flow Parameter | FP | — | 2.02 | 2.05 | 2.13 | 2.19 | 2.31 | 2.08 |
| HLMFR/MFR | | — | 105 | 112 | 135 | 155 | 204 | 120 |
| Yield Tensile Strength | YTS | kgf/cm$^2$ | 110 | 100 | 110 | 150 | 100 | 110 |
| Tensile Impact Strength | TIS | kgf·cm/cm$^2$ | 1010 | 1480 | 1010 | 920 | 1380 | 1210 |
| Izod Impact Strength | IIS | | | | | | | |
| (23° C., 3 mm) | | kgf·cm/cm$^2$ | NB* | NB | NB | NB | NB | NB |
| (−40° C., 4 mm) | | kgf·cm/cm$^2$ | NB | NB | 30 | 8.1 | NB | 55 |
| Flexural Strength (Olsen) | | kgf/cm$^2$ | 1870 | 1780 | 2050 | 2780 | 1810 | 1860 |
| Melt Tension | MT | g | 12 | 18 | 15 | 14 | 20 | 16 |
| Critical Shear Rate | $\gamma_c$ | sec$^{-1}$ | 640 | 330 | 480 | 590 | 200 | 440 |
| Melting Point | $T_m$ | °C. | 123 | 122 | 123 | 124 | 122 | 123 |
| ESCR (Constant Strain) | $F_{50}$ | hr | >1000 | >1000 | >1000 | >1000 | >1000 | >1000 |
| Spiral Flow Length | | mm | — | — | — | — | — | — |

NB*: Not broken

TABLE 6A

Physical Properties in Two-Step Polymerization (2A)

| Items | | Units | Examples 7 | 8 | 9 | 10 | 11 | 12 |
|---|---|---|---|---|---|---|---|---|
| (Higher Molecular Weight Components A) | | | | | | | | |
| Intrinsic Viscosity | $\eta_1$ | dl/g | 5.5 | 5.1 | 5.0 | 5.0 | 2.2 | 2.3 |
| Density | $d_1$ | g/cm$^3$ | 0.915 | 0.920 | 0.920 | 0.900 | 0.929 | 0.929 |
| Qty. Prepared | $E_1$ | kg/hr | 1.66 | 1.70 | 1.54 | 1.68 | 1.08 | 1.03 |
| Percentage | $X_1$ | wt. % | 42 | 44 | 45 | 50 | 27 | 26 |
| Ratio of Areas with TREF | S | — | 1.1 | 0.7 | 0.8 | 3.7 | 1.4 | 1.4 |
| Qty. soluble in 25° C. ODCB | W | wt. % | 3.2 | 1.3 | 1.8 | 36.0 | 4.0 | 3.7 |
| $S_1$ | | — | 1.7 | 1.4 | 1.47 | 4.00 | 2.1 | 2.0 |
| $W_1$ | | wt. % | 0.09 | 0.12 | 0.13 | 0.13 | 2.2 | 2.0 |
| (Lower Molecular Weight Components B) | | | | | | | | |
| Intrinsic Viscosity | $\eta_2$ | dl/g | 0.66 | 0.67 | 0.74 | 0.82 | 0.78 | 0.84 |
| Density | $d_2$ | g/cm$^3$ | 0.949 | 0.953 | 0.919 | 0.910 | 0.951 | 0.955 |
| Qty. Prepared | $E_2$ | kg/hr | 2.34 | 2.16 | 1.88 | 1.68 | 2.93 | 2.87 |
| Percentage | $X_2$ | wt. % | 54 | 56 | 55 | 50 | 73 | 74 |

TABLE 6B

Physical Properties in Two-Step Polymerization (2B)

| Items (Polyethylene Composition) | | Units | Examples 7 | 8 | 9 | 10 | 11 | 12 |
|---|---|---|---|---|---|---|---|---|
| Qty. Prepared | E | kg/hr | 4.00 | 3.86 | 3.42 | 3.36 | 4.01 | 3.90 |
| Intrinsic Viscosity | $\eta$ | dl/g | 2.69 | 2.62 | 2.66 | 2.91 | 1.16 | 1.22 |
| Melt Flow Rate | MFR | g/10 min | 0.063 | 0.075 | 0.068 | 0.039 | 10 | 7 |
| Density | d | g/cm$^3$ | 0.935 | 0.939 | 0.919 | 0.905 | 0.945 | 0.948 |
| N-Value | | — | 2.66 | 2.52 | 2.43 | 2.41 | 1.80 | 1.79 |
| Flow Parameter | FP | — | 2.11 | 2.11 | 2.03 | 2.02 | — | 1.62 |
| HLMFR/MFR | | — | 129 | 130 | 107 | 105 | — | 42 |
| Yield Tensile Strength | YTS | kgf/cm$^2$ | 160 | 200 | 100 | 60 | 200 | 240 |
| Tensile Impact Strength | TIS | kgf.cm/cm$^2$ | 960 | 660 | 960 | 2000 | 60 | 60 |
| Izod Impact Strength | IIS | | | | | | | |
| (23° C., 3 mm) | | kgf.cm/cm$^2$ | NB | 50 | NB | NB | 6 | 6 |
| (−40° C., 4 mm) | | kgf.cm/cm$^2$ | 7.3 | 6.4 | 42 | NB | 3.0 | 3.4 |
| Flexural Strength (Olsen) | | kgf/cm$^2$ | 3350 | 5000 | 2000 | 1000 | 5800 | 6200 |

TABLE 6B-continued

Physical Properties in Two-Step Polymerization (2B)

| Items (Polyethylene Composition) | | Units | 7 | 8 | 9 | 10 | 11 | 12 |
|---|---|---|---|---|---|---|---|---|
| Melt Tension | MT | g | 16 | 16 | 15 | 18 | — | — |
| Critical Shear Rate | $\gamma_c$ | sec$^{-1}$ | 430 | 340 | 440 | 300 | — | — |
| Melting Point | $T_m$ | °C. | 125 | 126 | 120 | 120 | 128 | 128 |
| ESCR (Constant Strain) | $F_{50}$ | hr | >1000 | >1000 | >1000 | >1000 | 60 | 70 |
| Spiral Flow Length | | mm | — | — | — | — | 600 | 530 |

TABLE 7A

Physical Properties in Two-Step Polymerization (3A)

| Items | | Units | 13 | 14 | 15 | 16 | 17 |
|---|---|---|---|---|---|---|---|
| (Higher Molecular Weight Components A) | | | | | | | |
| Intrinsic Viscosity | $\eta_1$ | dl/g | 2.5 | 4.3 | 3.8 | 5.0 | 3.1 |
| Density | $d_1$ | g/cm$^3$ | 0.918 | 0.910 | 0.909 | 0.927 | 0.930 |
| Qty. Prepared | $E_1$ | kg/hr | 1.12 | 1.26 | 1.26 | 0.68 | 0.71 |
| Percentage | $X_1$ | wt. % | 30 | 27 | 36 | 21 | 30 |
| Ratio of Areas with TREF | S | — | 2.4 | 2.1 | 2.7 | 0.5 | 0.9 |
| Qty. soluble in 25° C. ODCB | W | wt. % | 9.1 | 10.7 | 14.4 | 0.7 | 1.8 |
| $S_1$ | | — | 3.3 | 2.82 | 3.36 | 1.04 | 1.44 |
| $W_1$ | | wt. % | 1.6 | 0.27 | 0.45 | 0.13 | 0.90 |
| (Lower Molecular Weight Components B) | | | | | | | |
| Intrinsic Viscosity | $\eta_2$ | dl/g | 0.80 | 1.05 | 0.66 | 1.00 | 0.93 |
| Density | $d_2$ | g/cm$^3$ | 0.945 | 0.926 | 0.924 | 0.955 | 0.950 |
| Qty. Prepared | $E_2$ | kg/hr | 2.61 | 3.36 | 2.26 | 2.50 | 1.69 |
| Percentage | $X_2$ | wt. % | 70 | 73 | 64 | 79 | 70 |

TABLE 7B

Physical Properties in Two-Step Polymerization (3B)

| Items (Polyethylene Composition) | | Units | 13 | 14 | 15 | 16 | 17 |
|---|---|---|---|---|---|---|---|
| Qty. Prepared | E | kg/hr | 3.73 | 4.62 | 3.52 | 3.18 | 2.40 |
| Intrinsic Viscosity | $\eta$ | dl/g | 1.31 | 1.93 | 1.80 | 1.84 | 1.58 |
| Melt Flow Rate | MFR | g/10 min | 5 | 0.50 | 0.79 | 0.68 | 1.7 |
| Density | d | g/cm$^3$ | 0.937 | 0.920 | 0.918 | 0.949 | 0.944 |
| N-Value | | — | 1.83 | 2.13 | 2.66 | 2.28 | 1.87 |
| Flow Parameter | FP | — | 1.60 | 1.92 | 2.24 | 2.06 | 1.78 |
| HLMFR/MFR | | — | 40 | 83 | 174 | 115 | 60 |
| Yield Tensile Strength | TYS | kgf/cm$^2$ | 190 | 120 | 105 | 280 | 240 |
| Tensile Impact Strength | TIS | kgf.cm/cm$^2$ | 100 | 480 | 400 | 170 | 120 |
| Izod Impact Strength | IIS | | | | | | |
| (23° C., 3 mm) | | kgf.cm/cm$^2$ | 8 | NB | NB | 40 | 16 |
| (−40° C., 4 mm) | | kgf.cm/cm$^2$ | 4.1 | 17 | 25 | 14 | 11 |
| Flexural Strength (Olsen) | | kgf/cm$^2$ | 4700 | 2100 | 2100 | 7400 | 5500 |
| Melt Tension | MT | g | — | 6 | 5 | 7 | 3 |
| Critical Shear Rate | $\gamma_c$ | sec$^{-1}$ | — | 1200 | 2500 | 4000 | 8400 |
| Melting Point | $T_m$ | °C. | 126 | 123 | 122 | 128 | 127 |
| ESCR (Constant Strain) | $F_{50}$ | hr | 130 | >1000 | >1000 | 90 | 50 |
| Spiral Flow Length | | mm | 460 | 320 | 480 | 340 | 350 |

TABLE 8A

Physical Properties in Two-Step Polymerization (4A)

| Items | | Units | Comparative Example 1 | 2 | 3 | 4 | 5 | 6 |
|---|---|---|---|---|---|---|---|---|
| (Higher Molecular Weight Components A) | | | | | | | | |
| Intrinsic Viscosity | $\eta_1$ | dl/g | 5.0 | 5.0 | 4.9 | 5.2 | 5.0 | 4.9 |
| Density | $d_1$ | g/cm$^3$ | 0.934 | 0.938 | 0.933 | 0.931 | 0.932 | 0.933 |
| Qty. Prepared | $E_1$ | kg/hr | 1.30 | 1.42 | 1.40 | 1.72 | 1.80 | 1.80 |
| Percentage | $X_1$ | wt. % | 45 | 47 | 49 | 50 | 49 | 47 |
| Ratio of Areas with TREF | S | — | 0.17 | 0.15 | 0.24 | 0.29 | 0.30 | 0.29 |
| Qty. soluble in 25° C. ODCB | W | wt. % | 0.05 | 0.04 | 0.06 | 0.29 | 0.29 | 0.27 |
| $S_1$ | | — | 0.73 | 0.60 | 0.78 | 0.82 | 0.81 | 0.78 |
| $W_1$ | | wt. % | 0.13 | 0.13 | 0.15 | 0.11 | 0.13 | 0.15 |
| (Lower Molecular Weight Components B) | | | | | | | | |
| Intrinsic Viscosity | $\eta_2$ | dl/g | 0.49 | 0.53 | 0.47 | 0.54 | 0.53 | 0.50 |
| Density | $d_2$ | g/cm$^3$ | 0.927 | 0.913 | 0.915 | 0.970 | 0.970 | 0.971 |

TABLE 8A-continued

Physical Properties in Two-Step Polymerization (4A)

| Items | Units | | Comparative Example | | | | |
|---|---|---|---|---|---|---|---|
| | | | 1 | 2 | 3 | 4 | 5 | 6 |
| Qty. Prepared | $E_2$ | kg/hr | 1.58 | 1.58 | 1.47 | 1.72 | 1.88 | 2.03 |
| Percentage | $X_2$ | wt. % | 55 | 53 | 51 | 50 | 51 | 53 |

TABLE 8B

Physical Properties in Two-Step Polymerization (4B)

| (Polyethylene Composition) | | Units | Comparative Example | | | | | |
|---|---|---|---|---|---|---|---|---|
| | | | 1 | 2 | 3 | 4 | 5 | 6 |
| Qty. Prepared | E | kg/hr | 2.88 | 3.00 | 2.87 | 3.44 | 3.68 | 3.83 |
| Intrinsic Viscosity | $\eta$ | dl/g | 2.52 | 2.63 | 2.64 | 2.87 | 2.72 | 2.57 |
| Melt Flow Rate | MFR | g/10 min | 0.095 | 0.075 | 0.071 | 0.042 | 0.059 | 0.084 |
| Density | d | g/cm$^3$ | 0.930 | 0.925 | 0.924 | 0.951 | 0.951 | 0.953 |
| N-Value | | — | 2.58 | 2.47 | 2.48 | 2.65 | 2.59 | 2.63 |
| Flow Parameter | FP | — | 2.19 | 2.11 | 2.14 | 2.37 | 2.37 | 2.42 |
| HLMFR/MFR | | — | 154 | 129 | 138 | 234 | 232 | 263 |
| Yield Tensile Strength | YTS | kgf/cm$^2$ | 140 | 130 | 120 | 250 | 250 | 260 |
| Tensile Impact Strength | TIS | kgf.cm/cm$^2$ | 200 | 230 | 250 | 430 | 350 | 300 |
| Izod Impact Strength | IIS | | | | | | | |
| (23° C., 3 mm) | | kgf.cm/cm$^2$ | 30 | 33 | 35 | 17 | 16 | 14 |
| (−40° C., 4 mm) | | kgf.cm/cm$^2$ | 2.2 | 2.3 | 2.1 | 2.5 | 2.5 | 1.5 |
| Flexural Strength (Olsen) | | kgf/cm$^2$ | 3700 | 3000 | 2900 | 7300 | 7300 | 7800 |
| Melt Tension | MT | g | 11 | 9 | 8 | 19 | 18 | 16 |
| Critical Shear Rate | $\gamma_c$ | sec$^{-1}$ | 350 | 310 | 300 | 250 | 300 | 350 |
| Melting Point | $T_m$ | °C. | 126 | 125 | 125 | 128 | 128 | 129 |
| ESCR (Constant Strain) | $F_{50}$ | hr | >1000 | >1000 | >1000 | >1000 | >1000 | >1000 |
| Spiral Flow Length | | mm | — | — | — | — | — | — |

EXAMPLE 18 TO 22 AND COMPARATIVE EXAMPLE 7 TO 13

Figure 3:
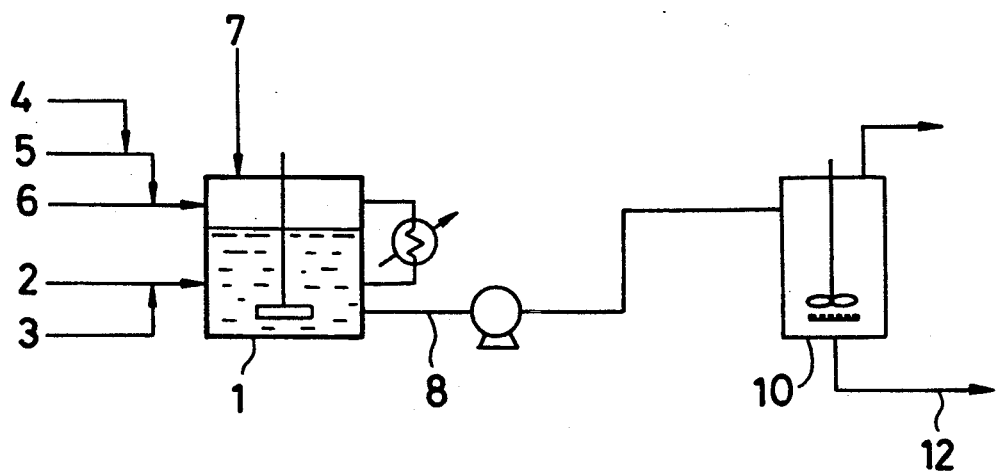
FIG. 3 is a flow sheet of one-step polymerization process used in the examples of the present invention.
Figure 4:
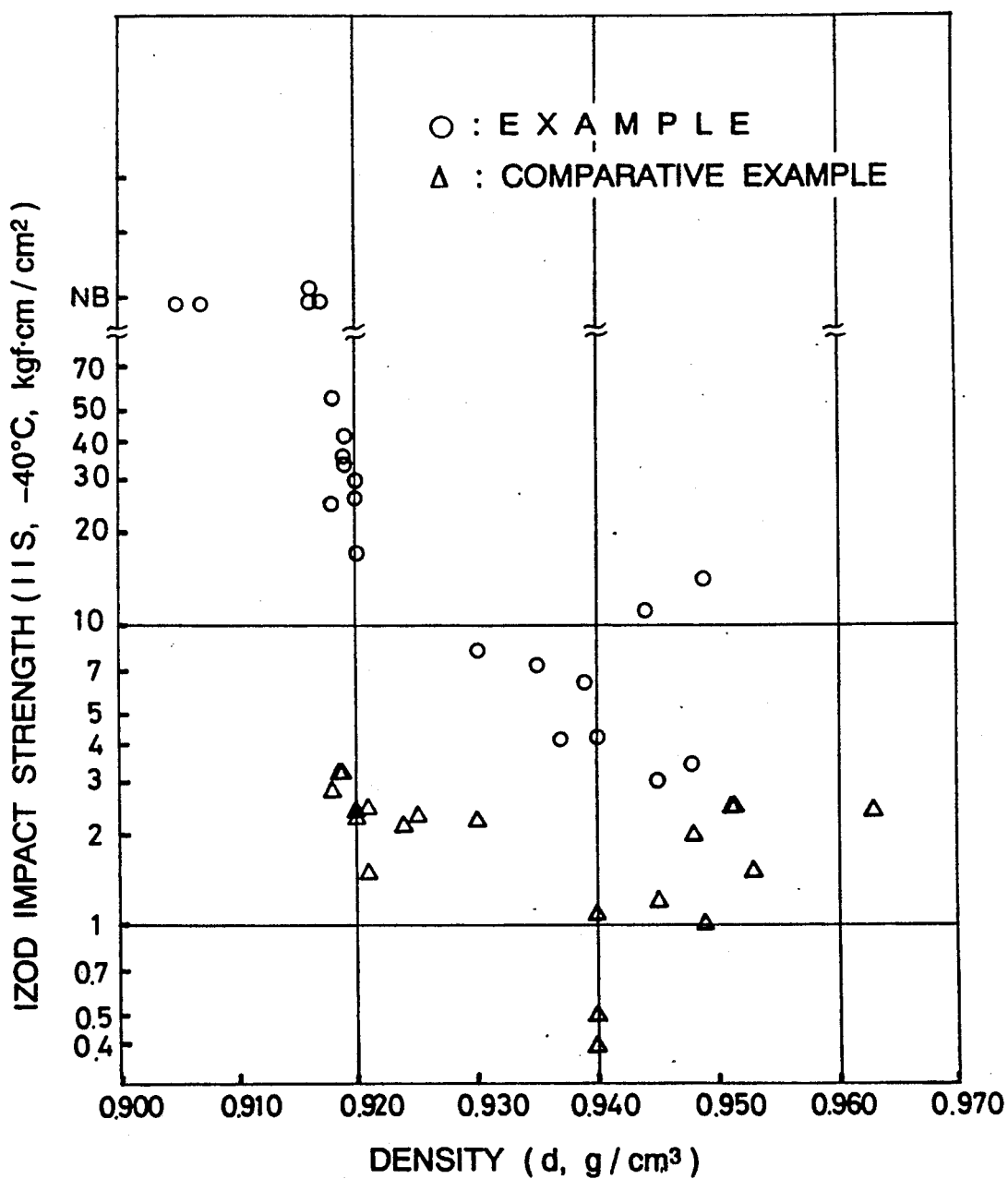
FIG. 4 is a graph showing the relation between density and Izod impact strength (−40° C.)
Figure 5:
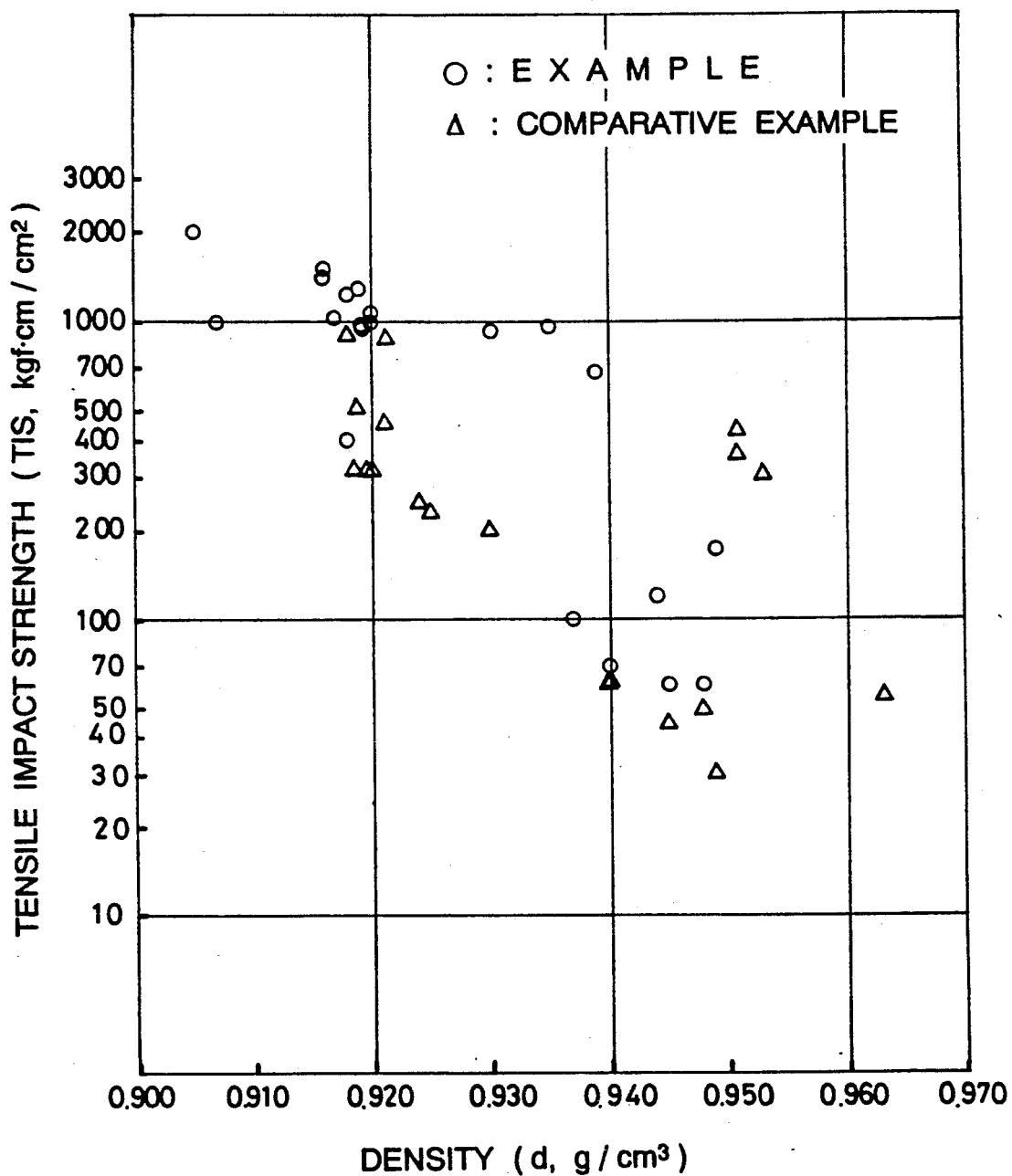
FIG. 5 is a graph showing the relation between density and tensile impact strength.
Figure 6:
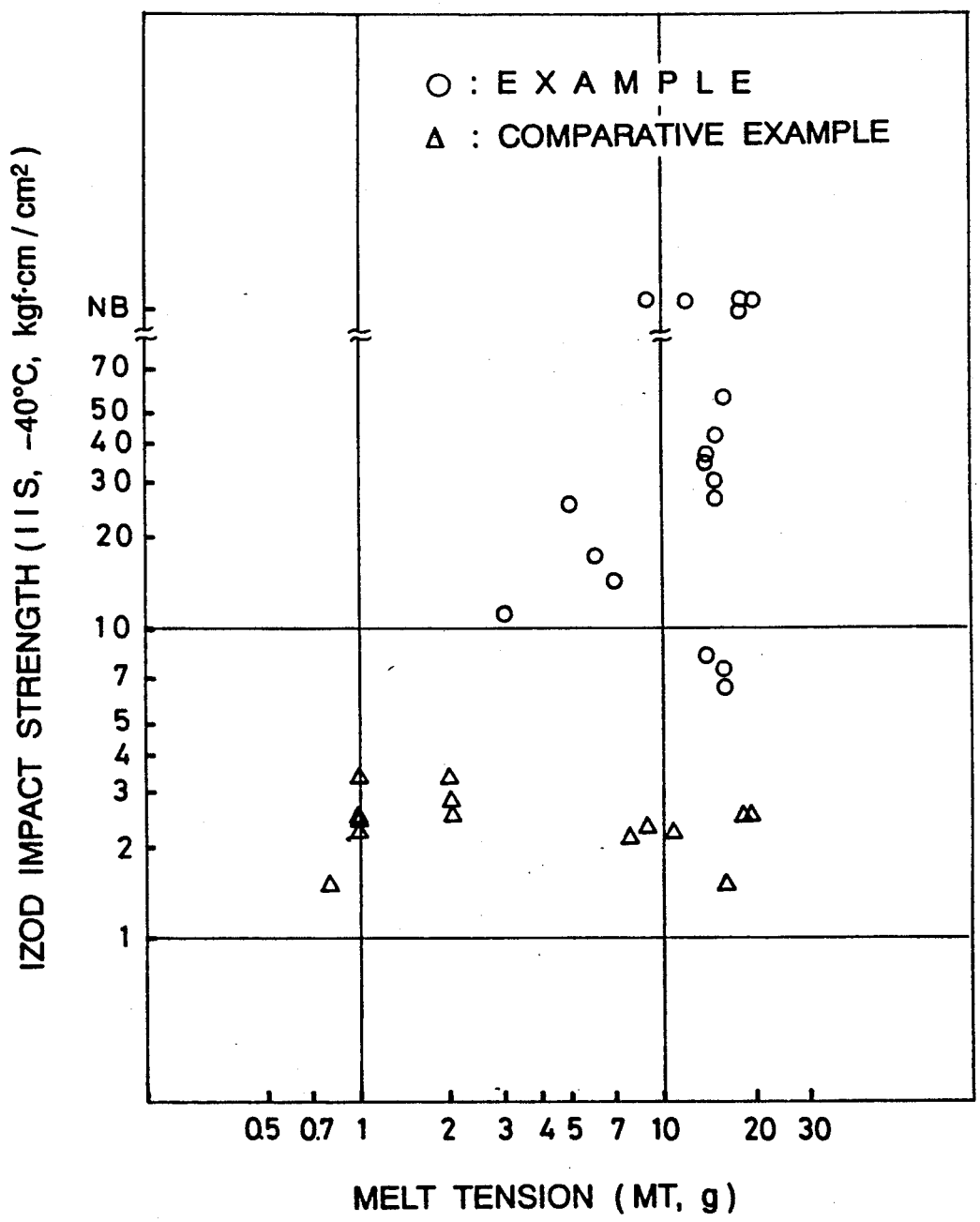
FIG. 6 is a graph showing the relation between melt tension and Izod, impact strength (−40° C.)
Figure 7:
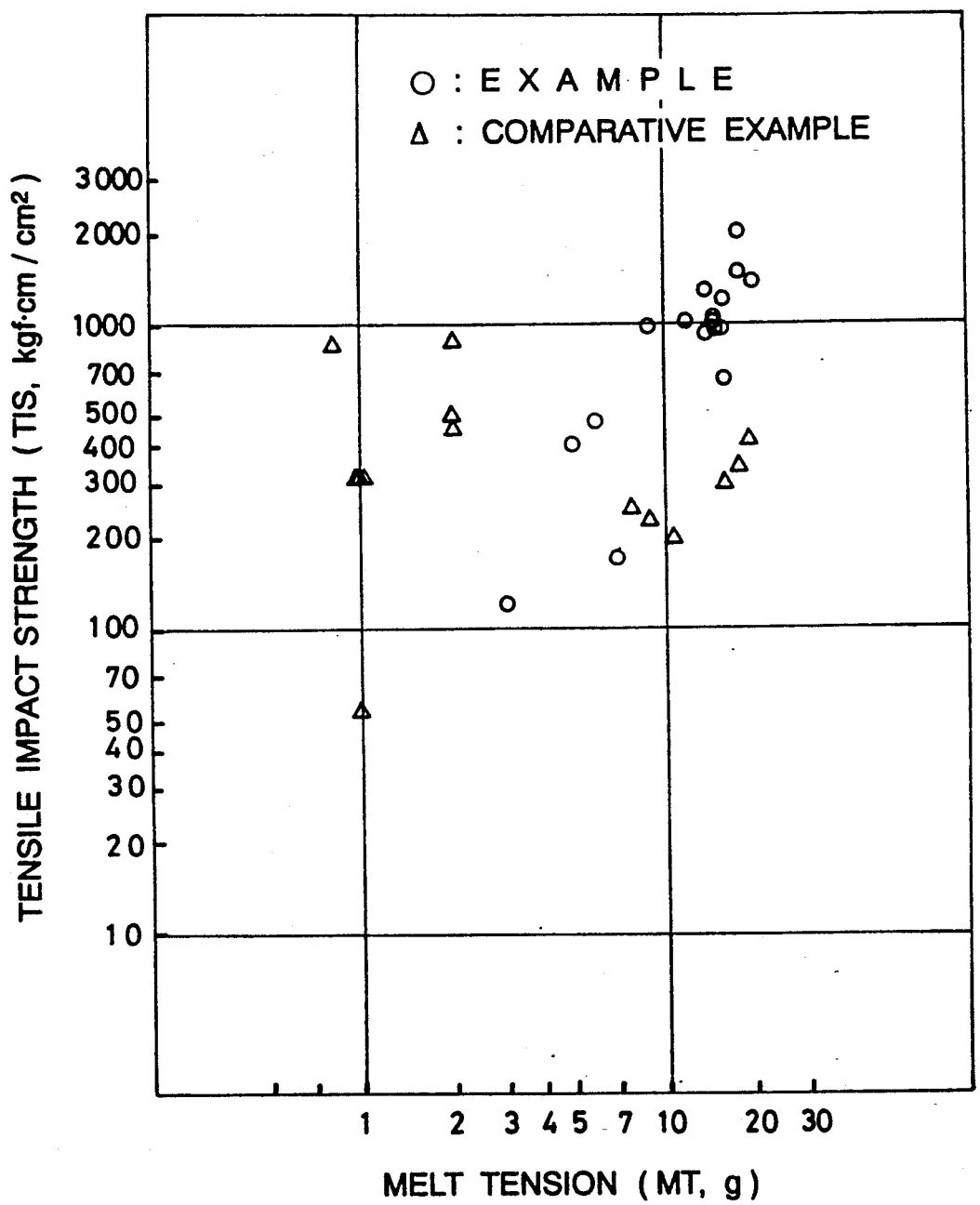
FIG. 7 is a graph showing the relation between melt tension and tensile impact strength.
Figure 8:
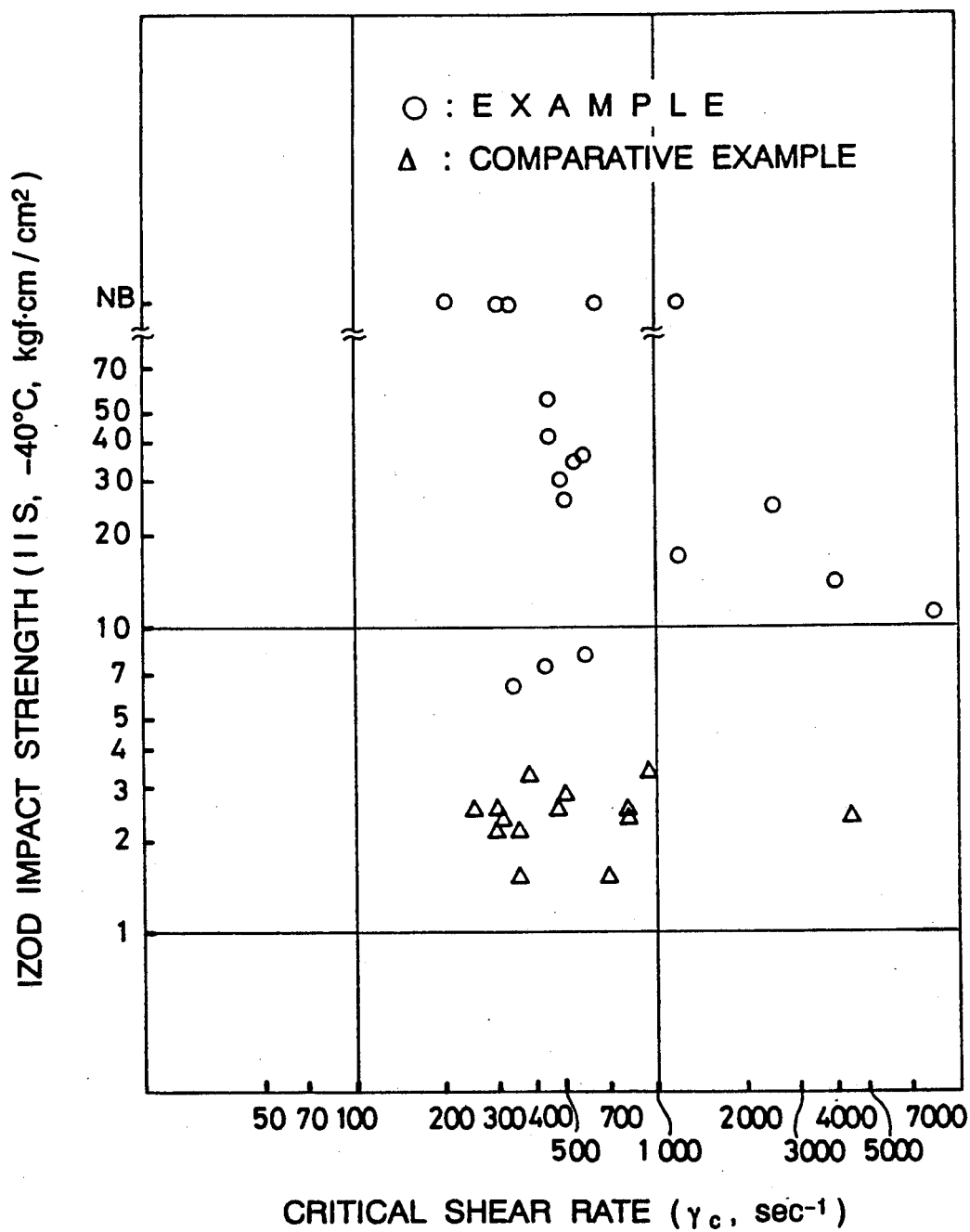
FIG. 8 is a graph showing the relation between critical shear rate and Izod impact strength (−40° C.).

A one-step polymerization process shown in FIG. 3 was carried out with a 70 liter reaction vessel 1 equipped with a stirrer. The used solid catalyst was titanium tetrachloride which was supported on a solid carrier containing a component of anhydrous magnesium chloride. The one-step continuous polymerization was carried out under the conditions shown in Tables 9 to 11 to obtain higher molecular weight components A1 to A8 and lower molecular weight components B1 to B5. The total pressure of the polymerization in the reactor was 8.0 to 9.7 kg/cm$^2$G and the volume of liquid phase was 50 liter.

Polyethylene compositions were prepared by blending these polymerization products under the following conditions using a Banbury mixer. The properties of the obtained compositions were measured and the results of which are shown in the following Tables 13A to 14B as Examples and Comparative Examples.

BLENDING CONDITIONS

Under N$_2$ atmosphere, quantity of fed materials: 3 kg, revolution: 200 rpm, kneading time: 5 minutes, kneading temperature: 150° to 180° C.

In the next step, one-step polymerization was carried out under N$_2$ atmosphere using a 2 liter autoclave to obtain high molecular weight components A9 to A12. The polymerization conditions of this step are shown in Table 12. Polyethylene compositions were prepared from the thus obtained high molecular weight components A and the above low molecular weight components B using Brabender plastograph under the following conditions. The properties of the obtained compositions were measured, the results of which are shown in the following Tables 13A to 14B as Examples and Comparative Examples.

BLENDING CONDITIONS

Under N$_2$ atmosphere, quantity of fed materials: 70 kg, revolution: 20 rpm, kneading time: 7 minutes, kneading temperature: 160° C.

TABLE 9

One-Step Polymerization (1)

| Items | Units | Higher Polymer Components A | | | |
|---|---|---|---|---|---|
| | | A1 | A2 | A3 | A4 |
| (Conditions) | | | | | |
| Qty. of Solvent | l/hr | 25 | 25 | 25 | 25 |
| Qty. of Ethylene | kg/hr | 3.0 | 3.0 | 3.0 | 2.5 |
| Qty. of Comonomer | l/hr | 3.0 | 4.0 | 3.6 | 7.8 |
| Kind of Comonomer | — | C$_4$ | C$_4$ | C$_6$ | C$_4$ |
| Qty. of Hydrogen | Nl/hr | 14 | 7 | 13 | 10 |
| Qty. of Solid Catalyst | g/hr | 0.07 | 0.07 | 0.08 | 0.10 |
| Qty. of Promoter (TEA) | mmol/hr | 15 | 15 | 15 | 15 |
| Ratio of Hydrogen/ethylene in Gas Phase Section | by mole | 0.039 | 0.012 | 0.025 | 0.042 |
| Ratio of Comonomer/Ethylene | by mole | 0.13 | 0.17 | 0.15 | 0.36 |

TABLE 9-continued

| | | One-Step Polymerization (1) | | | |
|---|---|---|---|---|---|
| | | Higher Polymer Components A | | | |
| Items | Units | A1 | A2 | A3 | A4 |
| in Gase Phase Section | | | | | |
| Polymerization Temperature | °C. | 70 | 70 | 70 | 55 |
| Polymerization Pressure | kg/cm$^2$G | 9.6 | 9.7 | 9.4 | 8.8 |
| Polymerization Time | hr | 1.6 | 1.6 | 1.6 | 1.6 |
| (Physical Properties) | | | | | |
| Intrinsic Viscosity   $\eta_1$ | dl/g | 4.3 | 5.0 | 4.8 | 5.0 |
| Melt Flow Rate   MFR | g/10 min | — | — | — | — |
| Density   $d_1$ | g/cm$^3$ | 0.919 | 0.914 | 0.918 | 0.900 |
| Qty. Prepared   $E_1$ | kg/hr | 3.1 | 3.0 | 2.9 | 2.9 |
| Ratio of Areas with TREF   S | — | 0.8 | 1.2 | 0.9 | 3.7 |
| Qty. soluble in 25° C. ODCB   W | wt. % | 2.0 | 4.0 | 2.5 | 36.0 |

TABLE 10

| | | One-Step Polymerization (2) | | | |
|---|---|---|---|---|---|
| | | Higher Polymer Components A | | | |
| Items | Units | A5 | A6 | A7 | A8 |
| (Conditions) | | | | | |
| Qty. of Solvent | l/hr | 35 | 35 | 35 | 35 |
| Qty. of Ethylene | kg/hr | 4.2 | 4.1 | 4.1 | 4.2 |
| Qty. of Comonomer | l/hr | 0.49 | 0.61 | 0.58 | — |
| Kind of Comonomer | — | $C_4$ | $C_4$ | $C_6$ | — |
| Qty. of Hydrogen | Nl/hr | 169 | 145 | 172 | 170 |
| Qty. of Solid Catalyst | g/hr | 0.30 | 0.45 | 0.45 | 0.30 |
| Qty. of Promoter (TEA) | mmol/hr | 21 | 11 | 11 | 21 |
| Ratio of Hydrogen/ethylene in Gas Phase Section | by mole | 0.69 | 0.81 | 0.85 | 0.70 |
| Ratio of Comonomer/Ethylene in Gas Phase Section | by mole | 0.032 | 0.045 | 0.030 | — |
| Polymerization Temperature | °C. | 80 | 80 | 80 | 80 |
| Polymerization Pressure | kg/cm$^2$G | 9.4 | 8.0 | 8.6 | 9.6 |
| Polymerization Time | hr | 1.2 | 1.2 | 1.2 | 1.2 |
| (Physical Properties) | | | | | |
| Intrinsic Viscosity   $\eta_1$ | dl/g | 1.22 | 1.05 | 1.00 | 1.31 |
| Melt Flow Rate   MFR | g/10 min | 7 | 17 | 23 | 5 |
| Density   $d_1$ | g/cm$^3$ | 0.948 | 0.945 | 0.949 | 0.963 |
| Qty. Prepared   $E_1$ | kg/hr | 4.1 | 3.8 | 4.0 | 4.0 |
| Ratio of Areas with TREF   S | — | — | — | — | — |
| Qty. soluble in 25° C. ODCB   W | wt. % | — | — | — | — |

TABLE 11

| | | One-Step Polymerization (3) | | | | |
|---|---|---|---|---|---|---|
| | | Lower Polymer Components B | | | | |
| Items | Units | B1 | B2 | B3 | B4 | B4 |
| (Conditions) | | | | | | |
| Qty. of Solvent | l/hr | 25 | 25 | 25 | 25 | 70 |
| Qty. of Ethylene | kg/hr | 2.8 | 2.9 | 2.7 | 2.0 | 4.0 |
| Qty. of Comonomer | l/hr | 2.6 | 2.6 | 1.9 | 8.5 | 0.1 |
| Kind of Comonomer | — | $C_4$ | $C_6$ | $C_4$ | $C_4$ | $C_4$ |
| Qty. of Hydrogen | Nl/hr | 48 | 215 | 300 | 280 | 184 |
| Qty. of Solid Catalyst | g/hr | 0.2 | 0.3 | 0.3 | 0.5 | 1.8 |
| Qty. of Promoter (TEA) | mmol/hr | 15 | 15 | 15 | 15 | 21 |
| Ratio of Hydrogen/ethylene in Gas Phase Section | by mole | 0.71 | 1.74 | 3.09 | 2.01 | 1.96 |
| Ratio of Comonomer/Ethylene in Gas Phase Section | by mole | 0.23 | 0.17 | 0.18 | 0.45 | 0.003 |
| Polymerization Temperature | °C. | 70 | 70 | 70 | 60 | 80 |
| Polymerization Pressure | kg/cm$^2$G | 8.8 | 11.0 | 12.7 | 14.5 | 12 |
| Polymerization Time | hr | 1.6 | 1.6 | 1.6 | 1.6 | 0.67 |
| (Physical Properties) | | | | | | |
| Intrinsic Viscosity   $\eta_2$ | dl/g | 1.00 | 0.76 | 0.47 | 0.85 | 0.80 |
| Density   $d_2$ | g/cm$^3$ | 0.918 | 0.925 | 0.920 | 0.910 | 0.960 |
| Qty. Prepared   $E_2$ | kg/hr | 3.5 | 3.1 | 3.3 | 2.5 | 4.2 |

TABLE 12

| | | One-Step Polymerization (4) | | | |
|---|---|---|---|---|---|
| | | Higher Polymer Components A | | | |
| Items | Units | A9 | A10 | A11 | A12 |
| (Conditions) | | | | | |

TABLE 12-continued

| | | One-Step Polymerization (4) | | | |
|---|---|---|---|---|---|
| | | Higher Polymer Components A | | | |
| Items | Units | A9 | A10 | A11 | A12 |
| Method of Polymerization | | Solution Method | Solution Method | Solution Method | Slurry Method |
| Kind of Solvent | | Cyclo-hexane | Cyclo-hexane | Cyclo-hexane | Hexane |
| Qty. of Solvent | liter | 1 | 1 | 1 | 1 |
| Maintained Pressure of Ethylene | kg/cm$^2$G | 20 | 20 | 20 | 7 |
| Qty. of Comonomer | g | 60 | 60 | 60 | 60 |
| Kind of Comonomer | — | $C_4$ | $C_4$ | $C_4$ | $C_4$ |
| Qty. of Hydrogen | ml | 150 | 150 | 150 | 150 |
| Qty. of Solid Catalyst | mg | 10 | 10 | 10 | 10 |
| Qty. of Promoter (TEA) | mmol | 0.5 | 0.5 | 0.5 | 0.5 |
| Polymerization Temperature | °C. | 170 | 170 | 170 | 170 |
| Polymerization Pressure | kg/cm$^2$G | 20 | 20 | 20 | 20 |
| Polymerization Time | hr | 1 | 1 | 1 | 1 |
| (Physical Properties) | | | | | |
| Intrinsic Viscosity $\eta_1$ | dl/g | 1.8 | 1.8 | 1.8 | 1.8 |
| Density $d_1$ | g/cm$^3$ | 0.919 | 0.919 | 0.919 | 0.919 |
| Qty. Prepared $E_1$ | g | 91 | 87 | 83 | 96 |
| Ratio of Areas with TREF S | — | 5.8 | 5.0 | 4.3 | 3.1 |
| Qty. soluble in 25° C. ODCB W | wt. % | 2.2 | 3.6 | 2.4 | 11.9 |

TABLE 13A

Physical Properties of the Mixture of One-Step Polymerization Products (1A)

| | | | Examples | | | | |
|---|---|---|---|---|---|---|---|
| Items | | Units | 18 | 19 | 20 | 21 | 22 |
| (Higher Molecular Weight Components A) | | | | | | | |
| Kind of Comonent A | | — | A1 | A2 | A3 | A4 | A12 |
| Intrinsic Viscosity | $\eta_1$ | dl/g | 4.3 | 5.0 | 4.8 | 5.0 | 1.8 |
| Density | $d_1$ | g/cm$^3$ | 0.919 | 0.914 | 0.918 | 0.900 | 0.919 |
| Percentage | $X_1$ | wt. % | 50 | 45 | 50 | 33 | 50 |
| Ratio of Areas with TREF | S | — | 0.8 | 1.2 | 0.9 | 3.7 | 3.1 |
| Qty. soluble in 25° C. ODCB | W | wt. % | 2.0 | 4.0 | 2.5 | 36.0 | 11.9 |
| $S_1$ | | — | 1.80 | 2.07 | 1.69 | 4.00 | 4.4 |
| $W_1$ | | wt. % | 0.27 | 0.13 | 0.16 | 0.13 | 3.4 |
| (Lower Molecular Weight Components B) | | | | | | | |
| Kind of Component B | | — | B1 | B2 | B3 | B4 | B5 |
| Intrinsic Viscosity | $\eta_2$ | dl/g | 1.00 | 0.76 | 0.47 | 0.85 | 0.80 |
| Density | $d_2$ | g/cm$^3$ | 0.918 | 0.925 | 0.920 | 0.910 | 0.960 |
| Percentage | $X_2$ | wt. % | 50 | 55 | 50 | 67 | 50 |

TABLE 13B

Physical Properties of the Mixture of One-Step Polymerization Products (1B)

| Items | | | Examples | | | | |
|---|---|---|---|---|---|---|---|
| (Polyethylene Composition) | | Units | 18 | 19 | 20 | 21 | 22 |
| Intrinsic Viscosity | $\eta$ | dl/g | 2.65 | 2.67 | 2.64 | 2.22 | 1.30 |
| Melt Flow Rate | MFR | g/10 min | 0.084 | 0.076 | 0.090 | 0.21 | 5 |
| Density | d | g/cm$^3$ | 0.919 | 0.920 | 0.919 | 0.907 | 0.940 |
| N-Value | | — | 2.23 | 2.41 | 2.43 | 2.39 | 1.75 |
| Flow Parameter | FP | — | 1.93 | 2.01 | 2.03 | 2.00 | 1.64 |
| HLMFR/MFR | | — | 85 | 102 | 107 | 100 | 44 |
| Yield Tensile Strength | YTS | kgf/cm$^2$ | 100 | 110 | 100 | 70 | 200 |
| Tensile Impact Strength | TIS | kfg.cm/cm$^2$ | 940 | 1060 | 1280 | 980 | 70 |
| Izod Impact Strength | IIS | | | | | | |
| (23° C. 3mm) | | kgf.cm/cm$^2$ | NB | NB | NB | NB | 6.0 |
| (−40 C., 4 mm) | | kgf.cm/cm$^2$ | 34 | 26 | 36 | NB | 4.2 |
| Flexural Strength (Olsen) | | kgf/cm$^2$ | 1900 | 2030 | 1960 | 1100 | 5000 |
| Melt Tension | MT | g | 14 | 15 | 14 | 9 | — |
| Critical Shear Rate | $\gamma_c$ | sec$^{-1}$ | 540 | 500 | 580 | 1200 | — |
| Melting Point | $T_m$ | °C. | 120 | 121 | 120 | 120 | 126 |
| ESCR (Constant Strain) | $F_{50}$ | hr | >1000 | >1000 | >1000 | >1000 | — |
| Spiral Flow Length | | mm | — | — | — | — | — |

TABLE 14A

Physical Properties of the Mixture of One-Step Polymerization Products (2A)

| Items | | Units | Comparative Example 7 | 8 | 9 | 10 | 11 | 12 | 13 |
|---|---|---|---|---|---|---|---|---|---|
| (Higher Molecular Weight Components A) | | | | | | | | | |
| Kind of Component A | | — | — | A9 | A10 | A11 | A5 | A6 | A7 | A8 |
| Intrinsic Viscosity | $\eta_1$ | dl/g | | 1.8 | 1.8 | 1.8 | 1.22 | 1.05 | 1.00 | 1.31 |
| Density | $d_1$ | g/cm³ | | 0.919 | 0.919 | 0.919 | 0.948 | 0.945 | 0.949 | 0.963 |
| Percentage | $X_1$ | wt. % | | 50 | 50 | 50 | 100 | 100 | 100 | 100 |
| Ratio of Areas with TREF | S | — | | 5.84 | 4.96 | 4.30 | — | — | — | — |
| Qty. soluble in 25° C. ODCB | W | wt. % | | 2.2 | 3.6 | 2.4 | — | — | — | — |
| $S_1$ | | — | | 4.4 | 4.4 | 4.4 | — | — | — | — |
| $W_1$ | | wt. % | | 3.4 | 3.4 | 3.4 | — | — | — | — |
| (Lower Molecular Weight Components B) | | | | | | | | | |
| Kind of Component B | | — | | B5 | B5 | B5 | — | — | — | — |
| Intrinsic Viscosity | $\eta$ | dl/g | | 0.80 | 0.80 | 0.80 | — | — | — | — |
| Density | $d_2$ | g/cm³ | | 0.960 | 0.960 | 0.960 | — | — | — | — |
| Percentage | $X_2$ | wt. % | | 50 | 50 | 50 | 0 | 0 | 0 | 0 |

TABLE 14B

Physical Properties of the Mixture of One-Step Polymerization Products (2B)

| Items | | Units | Examples 7 | 8 | 9 | 10 | 11 | 12 | 13 |
|---|---|---|---|---|---|---|---|---|---|
| (Polyethylene Composition) | | | | | | | | | |
| Intrinsic Viscosity | $\eta$ | dl/g | 1.30 | 1.30 | 1.30 | 1.22 | 1.05 | 1.00 | 1.31 |
| Melt Flow Rate | MFR | g/10 min | 5 | 5 | 5 | 7 | 17 | 23 | 5 |
| Density | d | g/cm³ | 0.940 | 0.940 | 0.940 | 0.948 | 0.945 | 0.949 | 0.963 |
| N-Value | | — | 1.72 | 1.74 | 1.73 | 1.56 | 1.47 | 1.47 | 1.56 |
| Flow Parameter | FP | — | 1.58 | 1.60 | 1.60 | 1.54 | NG* | NG | 1.55 |
| HLMFR/MFR | | — | 38 | 40 | 40 | 34 | NG | NG | 35 |
| Yield Tensile Strength | YTS | kgf/cm² | 200 | 200 | 200 | 260 | 240 | 270 | 310 |
| Tensile Impact Strength | TIS | kgf·cm/cm² | 60 | 61 | 60 | 50 | 45 | 30 | 55 |
| Izod Impact Strength | IIS | | | | | | | | |
| (23° C., 3 mm) | | kgf·cm/cm² | 5.0 | 5.0 | 5.0 | 5.0 | 4.0 | 3.0 | 4.2 |
| (−40° C., 4 mm) | | kgf·cm/cm² | 0.4 | 0.5 | 1.1 | 2.0 | 1.2 | 1.0 | 2.4 |
| Flexural Strength (Olsen) | | kgf/cm² | 4900 | 4900 | 5000 | 6600 | 7700 | 8000 | 11000 |
| Melt Tension | MT | g | — | — | — | — | — | — | 1.0 |
| Critical Shear Rate | $Y_c$ | sec⁻¹ | — | — | — | — | — | — | 4500 |
| Melting Point | $T_m$ | °C. | 124 | 124 | 125 | 126 | 127 | 128 | 132 |
| ESCR (Constant Strain) | $F_{50}$ | hr | — | — | — | 12 | 2 | 1 | 2.5 |
| Sprial Flow Length | | mm | — | — | — | 420 | 560 | 600 | 420 |

NG*: Not good

Comparative Examples 14 to 20

Commercially available linear low molecular weight polyethylene of the following trademark were evaluated, the results of which are shown in the following Table 15 and 16.

(1) Phillips LLDPE #10: made by Phillips Petroleum Co.
(2) NUC G5221: made by Nippon Unicar
(3) Idemitsu PE-L 0234H: made by Idemitsu Petrochemical
(4) DSM LLDPE 1016: made by DSM
(5) CdF LOTREX FW1290: made by CdF
(6) Dow LLDPE XD60008-130: made by Dow Chemical Corp.
(7) Ultzex 2520L: made by Mitsui Petrochemcial Industry

TABLE 15

Physical Properties of Commercially Available LLDPE (1)

| Items | | Units | Comparative Example 14 | 15 | 16 | 17 |
|---|---|---|---|---|---|---|
| Trademark | | — | Phillips LLDPE #10 | NUC G5221 | Idemitsu PE-L 0234H | DSM LLDPE 1016 |
| Polymerization Method | | — | Slurry | Gas Phase | Solution | Solution |
| Intrinsic Viscosity | $\eta$ | dl/g | 1.75 | 1.53 | 1.54 | 1.70 |
| Melt Flow Rate | MFR | g/10 min | 0.95 | 1.97 | 1.96 | 1.19 |
| Density | d | g/cm³ | 0.921 | 0.920 | 0.920 | 0.918 |
| N-Value | | — | 1.67 | 1.53 | 1.50 | 1.56 |
| Flow Parameter | FP | — | 1.57 | 1.46 | 1.44 | 1.49 |
| HLMFR/MFR | | — | 37 | 29 | 28 | 31 |
| Yield Tensile Strength | YTS | kgf/cm² | 110 | 105 | 105 | 105 |

TABLE 15-continued

Physical Properties of Commercially Available LLDPE (1)

| Items | | Units | Comparative Example | | | |
|---|---|---|---|---|---|---|
| | | | 14 | 15 | 16 | 17 |
| Tensile Impact Strength | TIS | kgf · cm/cm² | 460 | 320 | 320 | 900 |
| Izod Impact Strength | IIS | | | | | |
| (23° C., 3 mm) | | kgf · cm/cm² | NB | NB | NB | NB |
| (−40° C., 4 mm) | | kgf · cm/cm² | 2.5 | 2.3 | 2.5 | 2.8 |
| Flexural Strength (Olsen) | | kgf/cm² | 2000 | 1900 | 1900 | 1700 |
| Melt Tension | MT | g | 2.0 | 1.0 | 1.0 | 2.0 |
| Critical Shear Rate | $Y_c$ | sec⁻¹ | 480 | 820 | 810 | 500 |
| Melting Point | $T_m$ | °C. | 124 | 123 | 117 | 119 |
| ESCR (Constant Strain) | $F_{50}$ | hr | >1000 | >1000 | 1000 | >10000 |
| Spiral Flow Length | | mm | — | — | — | — |

TABLE 16

Physical Properties of Commercially Available LLDPE (2)

| Items | | Units | Comparative Example | | |
|---|---|---|---|---|---|
| | | | 18 | 19 | 20 |
| Trademark | | — | CdF LOTREX FW1290 | Dow LLDPE XD60008-130 | Mitsui Ultzex 2520L |
| Polymerization Method | | — | High pressure ionic polym. | High Pressure ionic polym. | Solution polym. |
| Intrinsic Viscosity | η | dl/g | 1.77 | 1.53 | 1.47 |
| Melt Flow Rate | MFR | g/10 min | 0.87 | 1.99 | 2.5 |
| Density | d | g/cm³ | 0.919 | 0.919 | 0.921 |
| N-Value | | — | 1.58 | 1.60 | 1.35 |
| Flow Parameter | FP | — | 1.50 | 1.52 | 1.33 |
| HLMFR/MFR | | — | 32 | 33 | 21 |
| Yield Tensile Strength | YTS | kgf/cm² | 110 | 110 | 110 |
| Tensile Impact Strength | TIS | kgf · cm/cm² | 500 | 320 | 880 |
| Izod Impact Strength | IIS | | | | |
| (23° C., 3 mm) | | kgf · cm/cm² | NB | NB | NB |
| (−40° C., 4 mm) | | kgf · cm/cm² | 3.3 | 3.3 | 1.5 |
| Flexural Strength (Olsen) | | kgf/cm² | 1900 | 1900 | 2000 |
| Melt Tension | MT | g | 2.0 | 1.0 | 0.8 |
| Critical Shear Rate | $Y_c$ | sec⁻¹ | 380 | 950 | 700 |
| Melting Point | $T_m$ | °C. | 119 | 116 | 122 |
| ESCR (Constant Strain) | $F_{50}$ | hr | >1000 | >1000 | >1000 |
| Spiral Flow Length | | mm | — | — | — |

RESULTS OF EVALUATION

Low or medium density polyethylene compositions prepared by two-step polymerization method are described in Examples 1 to 10, 14 and 15 and Comparative Examples 1 to 3. Low density polyethylene compositions prepared by blending method are described in Examples 18 to 21. High density polyethylene compositions prepared by two-step polymerization method are described in Examples 11 to 13, 16 and 17 and Comparative Examples 4 to 6. High density polyethylene compositions prepared by blending method are described in Examples 22 and Comparative Examples 7 to 9. High density polyethylene compositions prepared by one-step polymerization method are described in Examples 10 to 13 and commercially available linear low density polyethylenes are described in Comparative Examples 14 to 20.

Among the above data, particularly important values are plotted in FIG. 4 to FIG. 8.

From these results, it will be understood that the polyethylene composition prepared according to the present invention is quite excellent in low temperature mechanical strength.

The polyethylene composition of the present invention has the properties of thermal stability, ESCR and elasticity comparable to the conventional polyethylene compositions, in addition, the composition of the present invention has the following advantages:

(1) The composition excels in low temperature mechanical properties such as low temperature Izod impact strength and other low temperature resistance.

(2) The composition excels in mechanical properties such as tensile strength, flexural strength, environmental stress cracking resistance and creep resistance.

(3) The workability such as high speed forming property is good because the composition excels in melt elasticity such as melt tension and low characteristics such as critical shear rate.

(4) With the above advantages, the polyethylene composition of the present invention can be used for producing various kinds of films, sheets, pipes, hollow containers, coating or wrapping materials and foamed articles. Furthermore, various kinds of molded goods can be produced because the polyethylene composition of the invention can be processed by any molding method such as extrusion molding, blow molding and injection molding.

What is claimed is:

1. A polyethylene composition which comprises:

(I) 20 to 80 wt. % of a copolymer of ethylene and α-olefins having 3 to 18 carbon atoms, which copolymer meets the following conditions (a) to (d):
(a) intrinsic viscosity ($\eta_1$) 1.2 to 9.0 dl/g
(b) density ($d_1$): 0.890 to 0.935 g/cm$^3$
(c) in the elution temperature-eluate volume curve in continuously temperature rising elution fractionation, the ratio S (Ib/Ia) of the area Ib under the curve of elution temperature of 25° to 90° C. to the area Ia under the curve of elution temperature of 90° C. and above, is not larger than the value $S_1$ which is calculated with the following equation, $$S_1 = 20\, \eta_1^{-1} \exp\,[-50(d_1 - 0.900)]$$

(d) the quantity W wt. % of the content which is soluble in 25° C. o-dichlorobenzene is not smaller than the value $W_1$ which is calculated with the following equation, $$W_1 = 20 \exp(-\eta_1)$$

and
(II) 80 to 20 wt. % of ethylene homopolymer and/or the copolymer of ethylene and α-olefins having 3 to 18 carbon atoms, which meet the following conditions (e) and (f),
(e) intrinsic viscosity ($\eta_2$): 0.2 to 1.6 dl/g
(f) density ($d_2$): 0.890 to 0.980 g/cm$^3$ the value ($\eta_1$) is larger than ($\eta_2$), and the intrinsic viscosity ($\eta$) of the composition is 0.77 to 5.2 dl/g, the density (d) thereof is 0.890 to 0.950 g/cm$^3$ and the N-value calculated with the following equation is 1.7 to 3.5.

$$N\text{-Value} = \frac{\log\,(\dot{\gamma}_{150}/\dot{\gamma}_{20})}{\log\,(\tau_{150}/\tau_{20})}$$

wherein "$\dot{\gamma}$" is an apparent shear rate (sec$^{-1}$ at 170° C.) and "$\tau$" is an apparent shear stress (dyne/cm$^2$ at 170° C.) and the subscripts "20" and "150" indicates loads of 20 kg/cm$^2$ and 150 kg/cm$^2$.

2. The polyethylene composition as claimed in claim 1, wherein the α-olefin used for preparing said ethylene-α-olefin copolymer as said higher molecular weight component (I) is at least one member selected from the group consisting of 1-butene, 1-pentene, 1-hexene, 4-methyl-1-pentene, 1-heptene, 1-octene, 1-nonene and 1-decene.

3. The polyethylene composition as claimed in claim 1, wherein said lower molecular weight component (II) is ethylene homopolymer.

4. The polyethylene composition as claimed in claim 1, wherein said lower molecular weight component (II) is a copolymer of ethylene and at least an α-olefin selected from the group consisting of 1-butene, 1-pentene, 1-hexene, 4-methyl-1-pentene, 1-heptene, 1-octene, 1-nonene and 1-decene.

5. The polyethylene composition as claimed in claim 1 or 4, wherein said lower molecular weight component (II) is a mixture of ethylene homopolymer and ethylene-α-olefin copolymer.

* * * * *